(12) United States Patent
Chu et al.

(10) Patent No.: US 9,327,199 B2
(45) Date of Patent: May 3, 2016

(54) MULTI-TENANCY FOR CLOUD GAMING SERVERS

(71) Applicant: Microsoft Technology Licensing, LLC, Redmond, WA (US)

(72) Inventors: David Chiyuan Chu, Redmond, WA (US); Alastair Wolman, Seattle, WA (US); Roger Wattenhofer, Zurich (CH); Sergey Grizan, Krasnoyarsk Krai (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/200,437

(22) Filed: Mar. 7, 2014

(65) Prior Publication Data
US 2015/0251092 A1   Sep. 10, 2015

(51) Int. Cl.
| | | |
|---|---|---|
| A63F 9/24 | (2006.01) | |
| A63F 13/355 | (2014.01) | |
| A63F 13/35 | (2014.01) | |
| A63F 13/30 | (2014.01) | |

(52) U.S. Cl.
CPC ............... *A63F 13/355* (2014.09); *A63F 13/30* (2014.09); *A63F 13/35* (2014.09)

(58) Field of Classification Search
CPC .................... A63F 2300/538; A63F 13/355
See application file for complete search history.

(56) References Cited

U.S. PATENT DOCUMENTS

| | | | |
|---|---|---|---|
| 8,412,665 B2 | 4/2013 | Wang et al. | |
| 2011/0210982 A1 | 9/2011 | Sylvan et al. | |
| 2012/0001925 A1* | 1/2012 | Andonieh et al. | 345/502 |
| 2012/0044251 A1* | 2/2012 | Mark et al. | 345/474 |
| 2012/0105452 A1* | 5/2012 | Diard | 345/428 |
| 2013/0132510 A1 | 5/2013 | Ye et al. | |
| 2013/0274020 A1 | 10/2013 | Novotny et al. | |
| 2013/0307847 A1* | 11/2013 | Dey et al. | 345/419 |
| 2015/0134770 A1* | 5/2015 | Heinz et al. | 709/217 |

OTHER PUBLICATIONS

Cheung et al., "Next Generation Multiplayer Mobile Cloud Gaming: Technologies and System Designs," retrieved on Dec. 10, 2013 at <<http://istd.sutd.edu.sg/research/urop/next-generation-multiplayer-mobile-cloud-gaming-technologies-and-system-designs/>> 3 pages.

Haberman, "CiiNOW Proves Cloud Gaming is Better . . . Again!" Published Aug. 17, 2013, retrieved at <<http://www.ciinow.com/2013/08/ciinow-proves-cloud-gaming-is-betteragain/>> 2 pages.

(Continued)

*Primary Examiner* — Steve Rowland
(74) *Attorney, Agent, or Firm* — Alin Corie; Sandy Swain; Micky Minhas

(57) ABSTRACT

Some implementations may include one or more servers to host multiple game instances of game modules. The one or more servers may determine whether a difference between a total rendering time to render output data for the multiple game instances and a rendering capacity of the one or more processors is less than a predetermined rendering threshold. In response to determining that the difference between the total rendering time and the rendering capacity of the one or more processors is less than the predetermined rendering threshold, the one or more servers may adjust a rendering complexity associated with one or more of the plurality of game instances.

20 Claims, 10 Drawing Sheets

(56) References Cited

OTHER PUBLICATIONS

Lee et al., "Are All Games Equally Cloud-Gaming-Friendly? An Electromyographic Approach," In Proceedings 11th Annual Workshop on Network and Systems Support for Games (NetGames), Nov. 2012, retrieved at <<http://140.109.19.187/pub/lee12_cloudgaming.pdf>> 6 pages.

NVIDIA GeForce GTX 680, Published Mar. 29, 2012, retrieved from <<http://www.nvidia.in/content/PDF/product-specifications/GeForce_GTX_680_Whitepaper_FINAL.pdf>> 29 pages.

* cited by examiner

400 ↘

```
┌─────────────────────────────────────────────────────────────┐
│  EXECUTE MULTIPLE GAME INSTANCES, EACH GAME INSTANCE HAVING A│
│           CORRESPONDING RENDERING SETTING                    │
│                          402                                 │
└─────────────────────────────────────────────────────────────┘
                              ▼
┌─────────────────────────────────────────────────────────────┐
│  EXECUTE ONE OR MORE SHADOW INSTANCES, EACH SHADOW INSTANCE  │
│  SHADOWING ONE OF THE MULTIPLE GAME INSTANCES BUT WITH DIFFERENT│
│                     RENDERING SETTINGS                       │
│                          404                                 │
└─────────────────────────────────────────────────────────────┘
                              ▼
┌─────────────────────────────────────────────────────────────┐
│  DETERMINE A RENDERING TIME TO (1) RENDER AN OUTPUT FRAME OF GAME│
│  INSTANCES THAT ARE BEING SHADOWED AND (2) RENDER A SHADOW FRAME│
│                  OF THE SHADOW INSTANCES                     │
│                          406                                 │
└─────────────────────────────────────────────────────────────┘
                              ▼
┌─────────────────────────────────────────────────────────────┐
│  DETERMINE A DIFFERENCE IN ESTIMATED PERCEIVED QUALITY OF (1) THE│
│           OUTPUT FRAME AND (2) THE SHADOW FRAME              │
│                          408                                 │
└─────────────────────────────────────────────────────────────┘
                              ▼
┌─────────────────────────────────────────────────────────────┐
│  FOR EACH SHADOW INSTANCE, STORE (1) THE RENDERING SETTINGS OF THE│
│  SHADOW INSTANCES, (2) THE RENDERING TIME TO RENDER THE SHADOW│
│  FRAME (3) THE DIFFERENCE IN THE ESTIMATED PERCEIVED QUALITY BETWEEN│
│  THE OUTPUT FRAME AND THE SHADOW FRAME AND (4) ENVIRONMENTAL │
│                         SETTINGS                             │
│                          410                                 │
└─────────────────────────────────────────────────────────────┘
                              ▼
┌─────────────────────────────────────────────────────────────┐
│   RENDER A NEXT OUTPUT FRAME FOR EACH GAME INSTANCE BEING    │
│  SHADOWED AND A NEXT SHADOW FRAME FOR EACH SHADOW INSTANCE   │
│                          412                                 │
└─────────────────────────────────────────────────────────────┘
```

SERVER 106

GAMING DATA 134

| ENVIRONMENTAL SETTINGS 706 | RENDERING TIME 708 | RENDERING COMPLEXITY LEVEL 710 | ESTIMATED PERCEIVED QUALITY 712 | RESOURCE UTILIZATION (RU) 714 |
|---|---|---|---|---|
| 1st Entry 140<br><br>{Zone 152,<br>...<br>1st Object 158,<br>...<br>Rth Object 160} | X | High | Y | 1st RU 734 |
| 2nd Entry 702<br><br>{Zone 716,<br>...<br>1st Object 718,<br>...<br>Rth Object 720} | Z | Low | W | 2nd RU 736 |
| P-1 Entry 704<br><br>{Zone 722,<br>...<br>1st Object 724,<br>...<br>Rth Object 726} | A | High | B | P-1 RU 738 |
| Pth Entry 142<br><br>{Zone 728,<br>...<br>1st Object 730,<br>...<br>Rth Object 732} | C | Low | D | Pth RU 740 |

FIG. 7

MULTI-TENANCY FOR CLOUD GAMING SERVERS

BACKGROUND

Cloud gaming, in which datacenter servers host multiple game application instances (e.g., multi-tenancy) while clients merely transmit user input and display output (e.g. output frames) from servers has emerged as an alternative to traditional client-side gaming. Cloud gaming offers several advantages as compared to client-side gaming because cloud gaming may reduce issues associated with client-side system configurations and platform compatibility, thereby alleviating a long-standing headache of traditional non-console gaming and mobile device gaming. Thus, one advantage of cloud gaming is to enable many different types of client devices, with varying hardware capabilities and running various operating systems, to participate in games hosted by the datacenter servers. A second advantage of cloud gaming is that upgrading datacenter servers (e.g., for better visual quality or more sophisticated game play) is typically easier than upgrading individual client-based hardware or software. A third advantage is that players can select from a vast library of games and instantly play any of them instead of being tied to a game offerings for a specific client device.

However, cloud gaming multi-tenancy raises several issues that are not encountered in traditional datacenter multi-tenancy. First, cloud gaming provides a graphics intensive workload. Graphics rendering capability may be based on the availability and capacity of graphics processing units (GPUs). Meanwhile, other system resources, such as disk space, system memory, and central processing units (CPUs), may be underutilized compared to traditional datacenters. Second, hosting multiple gaming sessions involves meeting continuous deadlines. Acceptable gaming interactivity typically requires continuous frame processing of at least 30 frames per second (fps) because players typically become dissatisfied when frame rates fall below 30 fps. Third, games may include graphical effects, such as anti-aliasing, texture details, shadows, etc., that produce higher quality graphics. Thus, one challenge with cloud multi-tenancy gaming is enabling datacenter servers to host multiple players while maintaining graphics quality.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may include one or more servers to host multiple game instances of game modules. The one or more servers may determine whether a difference between a total rendering time to render output data for the multiple game instances and a rendering capacity of the one or more processors is less than a predetermined rendering threshold. In response to determining that the difference between the total rendering time and the rendering capacity of the one or more processors is less than the predetermined rendering threshold, the one or more servers may adjust a rendering complexity associated with one or more of the plurality of game instances to reduce the total rendering time without a proportional reduction in a total estimated perceived quality of the plurality of game instances. For example, the total estimated perceived quality may be maximized by adjusting the rendering complexity such that the drop in estimated perceived quality is within a tolerable limit.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a flow diagram of an example process that includes executing one or more shadow instances according to some implementations.

FIG. 7 is an illustrative architecture that includes gaming data according to some implementations.

DETAILED DESCRIPTION

Figure 1:
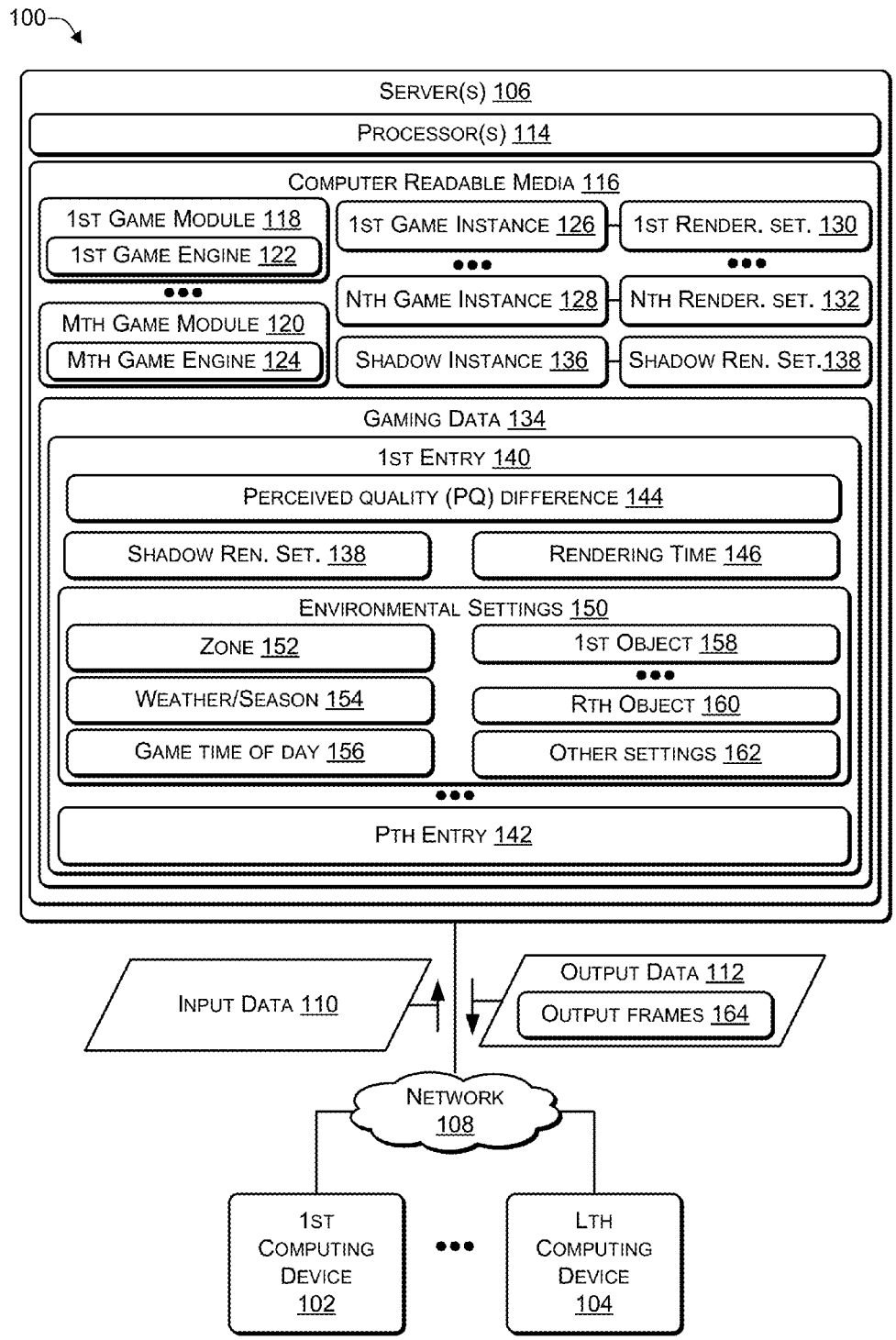
FIG. 1 is an illustrative architecture to gather gaming data according to some implementations.

As discussed above, with cloud multi-tenancy gaming, enabling datacenter servers to host multiple players while maintaining high quality graphics may be challenging. For example, over-provisioning datacenter servers may result in datacenter resources being under-utilized while under-provisioning datacenter servers may result in video quality that is unacceptable to some players, causing them to stop playing. Servers hosting games may use the systems and techniques described herein to create gaming data (e.g., profiles) that enable the servers to host a large number of gaming sessions while dynamically adjusting rendering settings of one or more gaming sessions based on a total rendering time and a total estimated perceived quality. For example, if the total amount of graphics processing for the gaming sessions is determined to approach the graphics processing capacity of the servers, the rendering settings of one or more of the gaming sessions may be adjusted to reduce rendering complexity (e.g., by reducing or eliminating lighting effects, shadows, environmental details, etc.). This reduction in rendering complexity may be perceived by users as a reduction in quality. The rendering complexity may be reduced for one or more of the gaming sessions in such a way as to minimize the drop in estimated perceived quality to the users of the particular devices, thereby maximizing the aggregate estimated perceived quality of all the users. For example, the complexity level of gaming sessions that take place in relatively dark environments (e.g., nighttime or interior scenes with little lighting) may be reduced with little or no drop in estimated perceived quality. At a later point in time, the complexity level of gaming sessions that were previously reduced in complexity may be dynamically increased if the servers have sufficient capacity. For example, if a gaming session whose complexity was previously reduced encounters a situation that would benefit from a higher complexity rendering (e.g., due to complex game play, well-lit environment, multiple moving objects, explosions, or the like) the rendering complexity of the gaming session may be increased if the servers have sufficient graphics processing capacity at that point in time. In some cases, the complexity of a second gaming session may be reduced to enable the complexity of a first gaming session to be increased. To illustrate, initially, the first gaming session may take place in a poorly-lit environment with relatively few moving objects and relatively few effects, while the second gaming session may take place in a well-lit environment with multiple moving objects and various complex effects. If the total rendering time of the gaming sessions approaches the rendering capacity of the servers, the rendering settings of the first gaming session may be adjusted, e.g., to lower the rendering complexity (e.g., thereby providing a lower quality output), because the drop in estimated perceived quality may be acceptable (e.g., imperceptible or barely perceptible) to the user. At a later point in time, the first gaming session may take place in a well-lit environment with multiple moving objects and various complex effects while the second gaming session may take place in a poorly-lit environment with relatively few moving objects and relatively few effects. At the later point in time, the rendering settings of the first gaming session may be adjusted to a higher complexity setting (e.g., resulting in higher quality rendering) while the rendering settings of the second gaming session may be adjusted to a lower complexity setting (e.g., resulting in a lower quality rendering). As used herein, the terms "HC" and "LC" refer to the rendering complexity of the output frames for a gaming session, whereas "estimated perceived quality" (also referred to herein as "perceived quality") is a measure that estimates how the output frames are perceived by a user of the gaming session. Thus, HC refers to a higher complexity rendering (e.g., with a corresponding higher quality rendering) while LC refers to a lower complexity rendering (e.g., with a corresponding lower quality rendering).

Determining when to adjust (e.g., reduce or increase) the complexity of rendering settings and identifying particular gaming sessions whose complexity may be adjusted may be performed by first gathering data for each game and then using the data to selectively adjust complexity levels of gaming sessions. The data may be gathered during off-peak times when the gaming servers are at less than full capacity and/or in a controlled environment (e.g., gaming servers that are not accessible to the general public or are accessible to select individuals). For example, the controlled environment may use simulated device input to perform regression testing to identify situations in each game where complexity can be reduced without incurring a proportional or significantly perceptible drop in the estimated perceived quality.

While the examples provided herein describe multiple game instances providing output frames to multiple computing devices, the system and techniques described herein may be used to provide multiple streams of multimedia content to multiple computing devices. For example, the system and techniques described herein may be used for a server system that transcodes multiple live video streams to provide multiple streams of multimedia content, such as movies, television shows, sporting events, news programs, and other types of multimedia content to multiple computing devices.

Thus, data may be gathered to identify situations in a game where the complexity provided to the user may be reduced without a proportional reduction in the estimated perceived quality. For example, low-light environments and environments with relatively simple game play may be identified as situations where the complexity and/or quality of the output frames may be reduced without significantly impacting the estimated perceived quality. The gathered data may be used when a gaming server is hosting multiple gaming sessions to select particular gaming sessions and to dynamically adjust (e.g., increase or decrease) the complexity and/or quality levels of the selected gaming sessions such that the available graphics processing capacity of the gaming server is not exceeded while providing a high level of aggregate estimated perceived quality to the multiple gaming sessions.

Illustrative Architectures

FIG. 1 is an illustrative architecture 100 to gather gaming data according to some implementations. The architecture 100 includes multiple computing devices, such as a first computing device 102 to an Lth computing device 104 (where L>1), coupled to one or more server 106 via a network 108. The network 108 may include one or more networks, such as a wireless local area network (e.g., WiFi®, Bluetooth™, or other type of near-field communication (NFC) network), a wireless wide area network (e.g., a code division multiple access (CDMA) network, a global system for mobile (GSM) network, or a long term evolution (LTE) network), a wired network (e.g., Ethernet, data over cable service interface specification (DOCSIS), Fiber Optic System (FiOS), Digital Subscriber Line (DSL) or the like), other type of network, or any combination thereof.

Each of the computing devices 102 to 104 may be a desktop computing device, a laptop computing device, a tablet computing device, a wireless phone, a media playback device, a media device, a set-top-box device, a gaming device, another type of computing device, or any combination thereof. The computing devices 102 to 104 may include one or more processors and one or more computer readable media. The computer readable media may store instructions that are organized into modules and that are executable by the one or more processors to perform various functions. The computing devices 102 to 104 may include a communications interface that enables the computing devices 102 to 104 to communicate with the server(s) 106 using the network 108 by sending input data 110 and receiving output data 112. The output data 112 may include multiple streams of multimedia content (e.g., audio and video content), with each stream sent to a particular device of the computing devices 102 to 104. Additionally or alternatively, the computing devices 102 to 104 may include one or more input devices (e.g., numeric keypad, QWERTY-based keyboard, mouse, trackball, joystick, microphone, motion sensor (e.g., such as an accelerometer an inertial measurement unit, a compass or the like), touch-sensitive surface, or the like) to generate the input data 110. The computing devices 102 to 104 may additionally or alternatively include one or more output devices (e.g., display screen, audio transducer such as a speaker or headphones, tactile generator for generating vibration or resistance, etc.) to output the output data 112.

The server 106 may include one or more processors 114 and one or more computer readable media 116. The processors 114 may include one or more central processing units (CPUs), graphics processing units (GPUs), arithmetic processing units (APUs), other types of processing units, and/or any combination thereof.

The computer readable media 116 may be used to store various types of data as well as instructions that are executable by the processors 114. The instructions may be organized into various modules, such as a first game module 118 to an Mth game module 120 (where M>1). The game modules 118 to 120 may provide the same video game or different video games. For example, the first game module 118 may provide a first game or type of video game (e.g., first person shooter) while the second game module 120 may provide a second game or type of video game (e.g., flight simulator). Each game module 118 may be based on a game engine. The game engine may provide a software framework for developers to create and develop video games. For example, the game engine may include a rendering engine for 2D or 3D graphics, a physics engine, collision detection (and collision response), sound, scripting, animation, artificial intelligence, networking, streaming, memory management, threading, etc. In FIG. 1, the first game module 118 is based on a first game engine 122 and the Mth game module 120 is based on an Mth game engine 124. In some implementations, the game engines 122 to 124 may be the same game engine while in other implementations, at least two of the game engines 122 to 124 may be different from each other. For example, in some implementations, each of the game engines 122 to 124 may be different to enable the server 106 to provide a wide variety of games.

When one of the computing devices 102 to 104 initiates (or resumes) playing a particular game provided by one of the game modules 118 to 120, a gaming instance of the particular game may begin executing. A gaming instance may also be referred to as a gaming session. The server 106 may host N game instances, such as a first game instance 126 to an Nth game instance 128 (where N>1 and N not necessarily equal to M). Each of the game instances 126 to 128 may be created based on one of the game modules 118 to 120. Each of the game instances 126 to 128 may have an associated set of rendering settings (abbreviated as "render. set." in FIG. 1), such as first rendering settings 130 associated with the first game instance 126 to Nth rendering settings 132. Each of the rendering settings 130 to 132 may specify various rendering-related settings. For example, the rendering settings 130 may include one or more of a complexity setting associated with one of the game instances 126 to 128, a screen resolution (e.g., 1920×1080 pixels, 1920×1600 pixels, and the like) of one of the computing devices 102 to 104, an available (e.g., or a maximum, a minimum, or an average) bandwidth for receiving data by one of the computing devices 102 to 104, another rendering-related setting, or any combination thereof. For illustration purposes, two complexity levels, e.g., high complexity (HC) and low complexity (LC), are used in many examples herein, where HC is a higher complexity rendering setting as compared to LC. However, it should be understood that additional complexity levels may be used in addition to HC and LC, such as a medium complexity (MC) that is in-between HC and LC. For example, X number of complexity settings (where X>1) may be provided and adjusted. Other rendering settings may include an anti-aliasing level (e.g., none, 2 times, 4 times, etc.), lighting effects, tessellation level, texture quality level, fog depth, motion blur, and the like. The number of complexity levels may include a combination chosen from the various rendering settings described herein.

The server 106 may gather gaming data 134 to enable the server 106 to identify game instances whose rendering settings may be dynamically adjusted. The gaming data 134 may be stored in a data structure, such as a table or other data structure. For example, if the server 106 determines that generating the output data 112 for the game instances 126 to 128, at the corresponding rendering settings 130 to 132, would approach (or exceed) the computing capacity or threshold of the server 106, the server 106 may identify a subset of the game instances 126 to 128 and reduce a rendering complexity setting from the corresponding rendering settings 130 to 132 of the subset without exceeding the computing capacity of the server 106. One or more of the rendering settings 130 to 132 may be adjusted in way that the total estimated perceived quality is maximized, e.g., the drop in total estimated perceived quality of the game instances 126 to 128 is less than proportional to the drop in total rendering time to render the game instances 126 to 128. For example, the drop in estimated perceived quality may be barely perceptible or imperceptible to the users.

While the systems, techniques, and examples herein are described with reference to the game modules 118 to 120, the systems, techniques, and examples described herein may also be applied to the game engines 122 to 124 instead of (or in addition) to the game modules 118 to 120. For example, the gaming data 134 may be gathered by shadowing or performing regression on game engines rather than game modules. The gaming data 134 may be used to adjust the rendering settings associated with game instances of games based on the game engines for which the gaming data 134 was gathered.

In addition, the systems, techniques, and examples described herein may be used to dynamically adjust the complexity level (or output quality level) of multiple multimedia streams being sent to the computing devices 102 to 104. Each of the multiple multimedia streams may be generated by each of multiple multimedia instances, similar to the game instances 126 to 128. If the total time to render the multiple multimedia streams approaches the processing capacity of the server 106 (e.g., total processing time for the multiple streams minus the processing capacity of the server 106 is less than a threshold), then the server 106 may adjust the complexity level of one or more of the instances that are generating the multiple multimedia streams such that the total processing time for the multiple multimedia streams does not exceed the processing capacity of the server 106 while maximizing the aggregate perceived quality of the multiple multimedia streams.

Collecting Gaming Data Using Shadowing

One way in which the server 106 may gather data is to create one or more shadow instances of the game instances 126 to 128 when the server 106 is relatively lightly loaded (e.g., N is relatively small). For example, the server 106 may create shadow instance 136 that is a synchronized copy of one of the game instances 126 to 128. The game instances 126 to 128 that are being shadowed may be associated with one of the computing devices 102 to 104. For example, the shadow instance 136 may mirror the game play occurring in the game instance that is being shadowed. The corresponding rendering settings, e.g., shadow rendering settings 138, of the shadow instance 136, may be different as compared to the rendering settings of the original game instance. For example, the shadow instance 136 may copy the game play of the Nth game instance 128 while the shadow rendering settings 138 may differ from the Nth rendering settings 132. To illustrate, the shadow rendering settings 138 may be at a lower or a higher rendering complexity level as compared to the Nth rendering settings 132. For example, the shadow rendering settings 138 may include a high complexity (HC) rendering setting and the Nth rendering settings 132 may include a low complexity (LC) rendering setting. As another example, the shadow rendering settings 138 may include an LC rendering setting and the Nth rendering settings 132 may include an LC rendering setting.

The server 106 may gather and store multiple entries in the gaming data 134, such as a first entry 140 to a Pth entry 142 (where P>1 and where L, M, N, and P may be different from each other). The server 106 may periodically (e.g., at a predetermined interval) compare an output frame F of the Nth game instance 128 with an output frame SF of the shadow instance 136. For example, the server 106 may compare each (or every other) output frame F of the Nth game instance 128 with each (or every other) output frame SF of the shadow instance 136. The server 106 may measure an amount of rendering (e.g., processing) time T to produce the output frame F and measure an amount of rendering time ST to produce the output frame SF. The server 106 may measure a difference in the estimated perceived quality (PQ) between output frame F and output frame SF. For example, the server 106 may determine a perceived quality difference (PQD) 144 between output frame F and output frame SF as follows: PQD=PQ(F)−PQ(SF). The estimated perceived quality (e.g., PQ(F) and PQ(SF)) may be measured using a structural similarity index measure (SSIM), perceptual evaluation of video quality (PEVQ), Peak Signal-to-Noise-Ration (PSNR) or another type of measurement of perceived quality.

The server 106 may store the estimated perceived quality difference 144, the shadow rendering settings 138, and a rendering time 146 associated with rendering an output frame of the shadow instance 136 in an entry (e.g., the first entry 140) of the gaming data 134. The server 106 may also record one or more environmental settings 150. The environmental settings 150 may be implemented using a data structure, such as a vector. The environmental settings 150 may include settings associated with the environment being rendered in the Nth game instance 128 and the shadow instance 136. The environmental settings 150 may be the same for both the Nth game instance 128 and the shadow instance 136 because the shadow instance 136 is shadowing the game play of the Nth game instance 128. The environmental settings 150 may be specific to a particular game module (e.g., gaming application). The environmental settings 150 may include a zone 152, weather/season 154, game time of day 156, one or more visible objects, such as a first object 158 to an Rth object 160, and other settings 162. For example, the zone 152 may identify a particular region or area, such as the interior of a building or an outdoor area, where the game play is taking place. For an outdoor area, the weather/season 154 may indicate an amount of sunshine, clouds, rain, snow, lightening, or other weather or season related rendering information. The game time of day 156 may indicate a time of day associated with the game play, e.g., whether the game play is taking place during the day, at night, at sunrise, at sunset, etc. The objects 158 to 160 may identify objects, such as monsters or aliens, spaceships, etc. that are visible in the output frame. For example, the first object 158 may identify a number of a first type of object that is visible or potentially visible in the output frames while the Rth object 160 may identify a number of an Rth type of object that is visible or potentially in the output frames. Potentially visible means that the object may currently be obscured by another object in a frame or the object may be nearby, e.g., just outside a field of view of a current frame. For example, in a first person shooter, an object may be obscured in a current frame by another object, such as a monster. If the monster is shot and killed and falls down (or is vaporized) or if the monster makes an evasive maneuver, at least a portion of the object that was previously obscured may be displayed in a subsequent frame. As another example, an object just outside the view of a user in a current frame may become visible in a subsequent frame if the object is moving or if the user's perspective changes (e.g., the user's character in the game moves, resulting in a different field of view in the subsequent frame. Nearby objects may be objects just outside a field of view in a current frame, or may be objects in the same game zone (regardless of line-of-site visibility). Zones may be used to segment a game's map into smaller regions. Games and game engines may maintain a list or table of potentially visible objects in each zone. The other settings 162 may include other environmental factors of the output frame that may be taken into consideration when determining whether to adjust the rendering settings of a game instance.

The output data 112 may include output frames 164. For example, the output frames 164 may include a first output frame for the first computing device 102 and an Lth output frame for the Lth computing device.

The gaming data 134 may be used to identify environments where the estimated perceived quality difference 144 is relatively small and to adjust the rendering settings of the corresponding game instances accordingly. For example, when the server 106 determines that the game instances 126 to 128 are approaching the rendering capacity of the server 106, the server 106 may identify particular game instances from the game instances 126 to 128 whose rendering complexity may be reduced based on the gaming data 134. To illustrate, the game play of the Nth game instance 128 may take place in a poorly lit environment (e.g., overcast sky, indoors with little light, or at night) while the game play of the first game instance 126 may take place in a brightly lit environment with multiple monsters approaching. The environmental settings 150 of the Nth game instance 128 may indicate that the estimated perceived quality difference 144 between HC and LC may be relatively small compared to the environmental settings 150 of the first game instance 126. In this example, when the server 106 determines that the game instances 126 to 128 are approaching the rendering capacity of the server 106, the server 106 may adjust the Nth rendering settings 132 from HC to LC because the perceived quality difference for adjusting the Nth game instance 128 from HC to LC is less than the perceived quality difference for adjusting the first game instance 126 from HC to LC. At a later point in time, the game play of the Nth game instance 128 may take place in a brightly lit environment while the game play of the first game instance 126 may take place in a poorly lit environment. In this situation, the server 106 may adjust the Nth rendering settings 132 from LC to HC and adjust the first rendering settings 130 from HC to LC.

Collecting Gaming Data Using Regression

A disadvantage with shadowing one or more of the game instances 126 to 128 is that all possible environmental settings for the game modules 118 to 120 that are instantiated (e.g., as the game instances 126 to 128) may not be encountered because the shadow instance 136 is shadowing a game instance associated with a user (e.g., using one of the computing devices 102 to 104). One approach to systematically collecting the gaming data 134 is to use regression to build entries in the gaming data 134 for each element of the environmental settings 150.

The regression may be performed by executing two or more game instances of each of the game modules 118 to 120, with each game instance having a different rendering setting. The server 106 may hold all but one setting of the environmental settings 150 invariant and add entries to the gaming data 134 while varying the other settings of the environmental settings 150. For example, for each zone 152 that is encountered in a game provided by one of the game modules 118 to 120, the server 106 may store entries for various types of weather/season 154, various game time of day 156, various numbers of the objects 158 to 160, and so on. Each entry that is added may include the perceived quality difference 114, the shadow rendering settings 138 (e.g., rendering settings associated with the LC rendering settings), and the rendering time 146. For example, for an indoor scene in a first building, the server 106 may add entries to the gaming data 134 based on a number of the objects 158 to 160.

The regression may be performed when the server 106 is lightly loaded (e.g., N is relatively small). In some cases, after the gaming data 134 has been gathered (e.g., using shadow instances or regression), the gaming data 134 may be analyzed and entries that are identified as redundant may be removed. For example, for a particular environmental setting, varying the other environmental settings may have little or no impact on the perceived quality difference 144. To illustrate, in a particular zone that has a poorly-lit environment (e.g., a cave), varying the weather or season, the game time of day, or the number of objects, may not result in a change to the perceived quality difference. The first entry 140 may specify that when zone 152 identifies the particular zone, the other environmental settings may be ignored because the perceived quality difference 144 is the same regardless of the other environmental settings. As another illustration, when the zone 152 specifies an outdoor zone and the game time of day specifies night time, the perceived quality difference 144 does not change regardless of how many of the objects 158 are in the output frame. Thus, the gaming data 134 may be thinned out by removing entries where changes to the environmental settings 150 do not result in a change to the perceived quality difference 144.

Thus, the server 106 may gather gaming data 134 using techniques such as shadow game instances or regression. The game data 134 may enable the server 106 to identify which of the rendering settings 130 to 132 (corresponding to the game instances 126 to 128) may be adjusted (e.g., from HC to LC or from LC to HC). The server 106 may dynamically adjust the rendering settings 130 to 132 such that the total amount of processing time (e.g., rendering time) to render the output frames for the game instances 126 to 128 does not exceed the processing capacity of the server 106. For example, if the server 106 determines that the total amount of processing time to render the output frames for the game instances 126 to 128 would exceed the processing capacity of the server 106, the server 106 may adjust one or more of the rendering settings 130 to 132 (e.g., from HC to LC) based on which game instances 126 to 128 would incur the smallest drop in estimated perceived quality. Thus, one or more of the rendering settings 130 to 132 may be adjusted (e.g., from HC to LC) in a way that maximizes the aggregate estimated perceived quality of the game instances 126 to 128 without exceeding the processing capacity of the server 106.

When the server 106 determines that one or more of the game instances 126 to 128 can be re-adjusted (e.g., from a lower complexity to a higher complexity) without exceeding the processing capacity, the server 106 may selectively re-adjust one or more of the game instances 126 to 128 based on which game instances 126 to 128 would incur the greatest increase in estimated perceived quality. Thus, one or more of the rendering settings 130 to 132 may be adjusted (e.g., from a lower complexity to a higher complexity) in a way that maximizes the aggregate estimated perceived quality of the game instances 126 to 128 without exceeding the processing capacity of the server 106.

Figure 2:
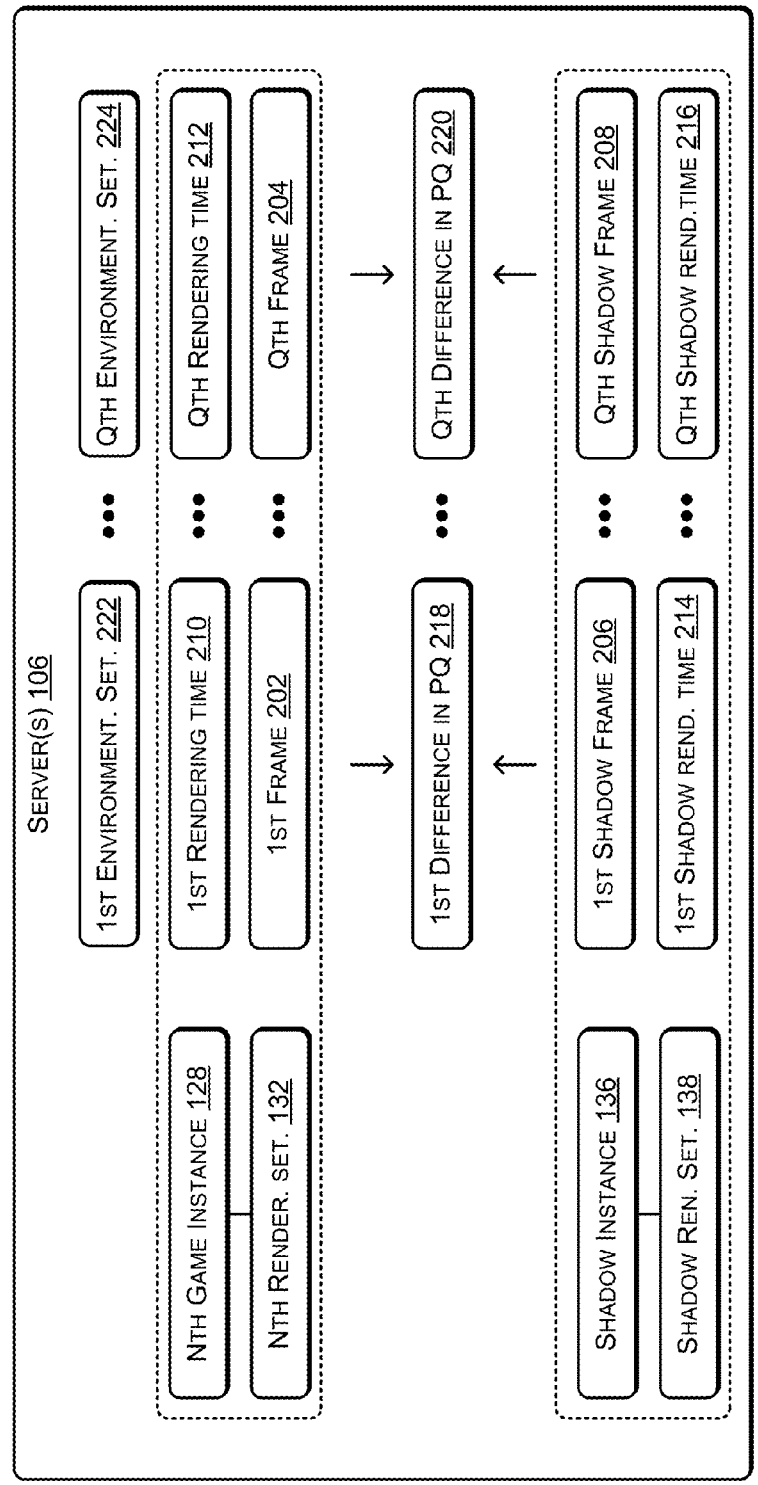
FIG. 2 is an illustrative architecture to determine differences in perceived quality according to some implementations.

FIG. 2 is an illustrative architecture 200 to determine differences in perceived quality according to some implementations. The architecture 200 illustrates how the server 106 may determine the difference in perceived quality between two or more game instances. While FIG. 2 illustrates determining the difference in perceived quality between two game instances, e.g., the Nth game instance 128 and the shadow instance 136, the techniques described herein may be used to determine the difference in perceived quality between more than two game instances.

The Nth game instance 128 may have a corresponding Nth set of rendering settings 132. The shadow instance 136 may have a corresponding set of shadow rendering settings 138. The Nth set of rendering settings 132 are different from the shadow rendering settings 138. For example, the Nth set of rendering settings 132 may have a higher complexity rendering setting as compared to the shadow rendering settings 138. To illustrate, the Nth set of rendering settings 132 may be set to HC and the shadow rendering settings 138 may be set to LC.

The Nth game instance 128 may output (e.g., as the output data 112 of FIG. 1) multiple output frames, such as a first frame 202 to a Qth frame 204 (where Q>1). The shadow instance 136 may output multiple output frames, such as a first shadow frame 206 to a Qth frame 204 (where Q>1). The server 106 may determine an amount of rendering time (e.g., processing time) to generate each output frame. For example, the server 106 may determine a first rendering time 210 to generate the first frame 202, a Qth processing 212 to generate the Qth frame 204, a first shadow rendering time 214 to generate the first shadow frame 206, and a Qth shadow rendering time 216 to generate the Qth shadow frame 208.

The game play of the shadow instance 136 may shadow the game play of the Nth game instance 128. Thus, each frame generated by the Nth game instance 128 may depict the same scene as the first shadow frame 206, but based on a different rendering setting, e.g., the output frames of the Nth game instance 128 may be based on the Nth rendering settings 132 and the output frames of the shadow instance 136 may be based on the shadow rendering settings 138. For example, the output frames of the Nth game instance 128 may depict a scene in HC while the output frames of the first shadow frame 206 may depict the same scene in LC.

The server 106 may determine a difference in perceived quality (PQ) between one or more of the frames 202 to 204 (of the Nth gaming instance 128) and the corresponding frames 206 to 208 (of the shadow instance 136). For example, the server 106 may determine a difference in perceived quality 218 between the first frame 202 and the first shadow frame 206 and determine a difference in perceived quality 220 between the Qth frame 204 and the Qth shadow frame 206. Depending on the implementation, the server 106 may determine a difference in perceived quality between every frame, or between every Z number of frames (where Z>1). For example, in some implementations, the server 106 may determine a difference in perceived quality between every other frame, between every fifteenth frame (Z=15), every thirtieth frame (Z=30), etc.

The server 106 may determine environmental settings associated with each frame. Because the shadow instance 136 is shadowing the Nth game instance 128, the environmental settings are the same for the corresponding frames. For example, first environmental settings 222 may correspond to the first frame 202 and the first shadow frame 206 and Qth environmental settings 224 may correspond to the Qth frame 204 and the Qth shadow frame 208. The server 106 may store (e.g., in the gaming data 134 of FIG. 1) the rendering times 214 to 216, the shadow rendering times 214 to 216, the difference in perceived quality 218 to 220, and the environmental settings 222 to 224. The environmental settings 222 to 224 may identify the environments corresponding to the frames 202 to 204 (and the frames 206 to 208). For example, the first environmental settings 222 may indicate that the first frame 202 and the first shadow frame 206 depict a well lit interior of a building with three objects (e.g., monsters) approaching. As another example, the Qth environmental settings 224 may indicate that the Qth frame 204 and the Qth shadow frame 208 depict a forest with many trees at night with one object approaching.

Thus, the server 106 may repeatedly compare output frames from two (or more) game instances of the same game, with each game instance having different rendering settings, to determine the difference in perceived quality between the frames. The server 106 may determine the amount of rendering time (e.g., processing time) to render the output frames. The server 106 may determine the environmental settings for the output frames, e.g., what type of zone or region the action in which the game play is taking place, the number of moving objects, the amount of lighting, etc. The server 106 may use the rendering time and the difference in perceived quality to perform a cost-benefit analysis (e.g., where rendering time is the cost and the difference in perceived quality is the benefit) to adjust the rendering settings of select game instances to maximize the benefits (estimated perceived quality) for the game instances while adjusting the costs such that the costs do not exceed the available processing capacity.

Dynamically Adjusting Rendering Settings

Figure 3:
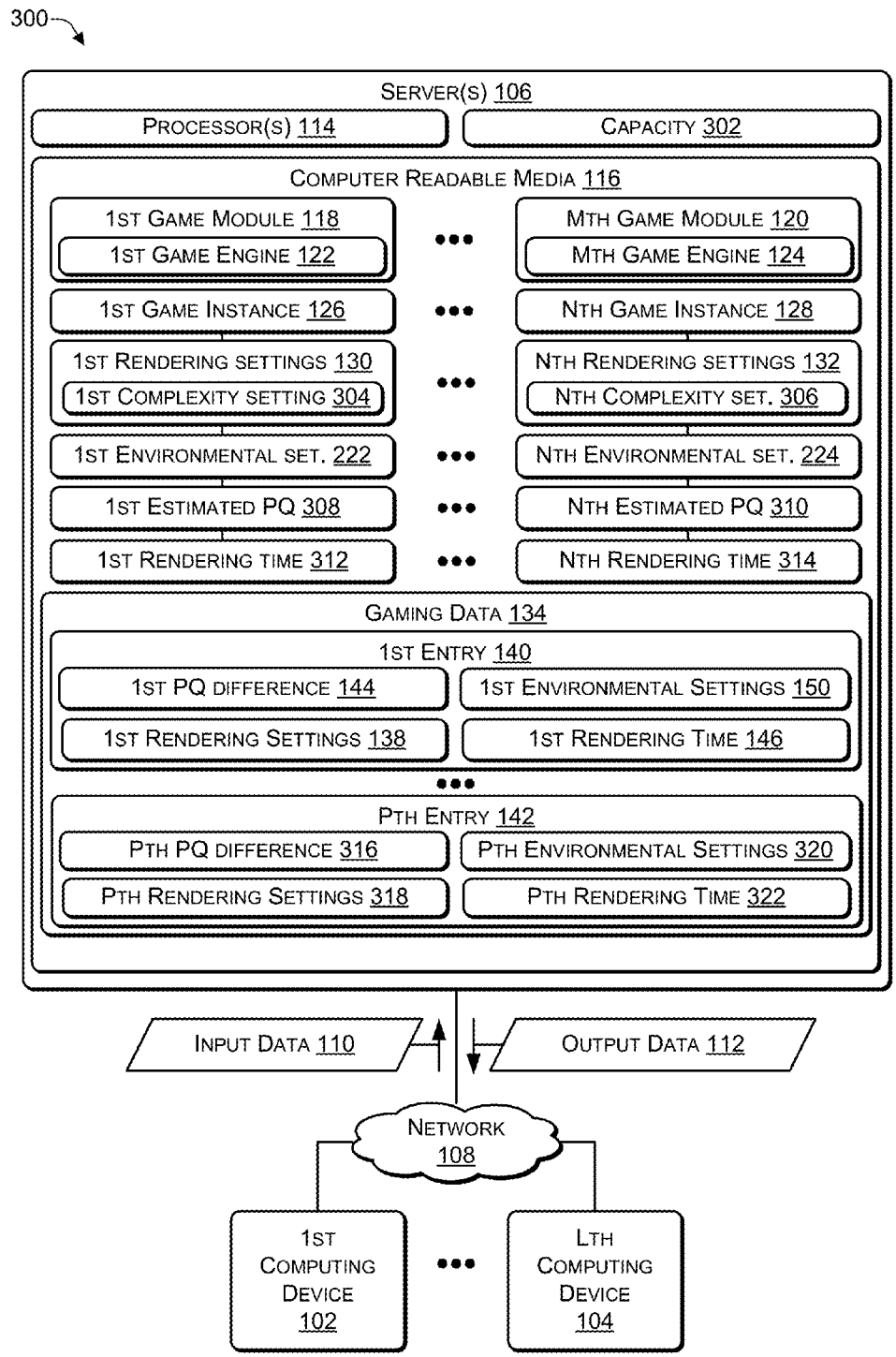
FIG. 3 is an illustrative architecture to adjust rendering settings based on gaming data according to some implementations.

FIG. 3 is an illustrative architecture 300 to adjust rendering settings based on gaming data according to some implementations. The architecture 300 may be used when the server 106 begins to approach 100% utilization of a capacity 302 (e.g., a rendering capacity or a processing capacity) of the server 106. For example, the techniques described herein may be used when the capacity 302 of the server 106 is greater than a threshold amount, such as 80% of the capacity 302, 90% of the capacity 302, or the like. The threshold amount may be set by a system administrator. As another example, the techniques described herein may be used when a difference between the processing capacity 302 and the total amount of rendering time to render the game instances 126 to 128 is less than a predetermined rendering threshold.

The server 106 may host the game instances 126 to 128 with the corresponding rendering settings 130 to 132. Each of the rendering settings 130 to 132 may identify various settings associated with the rendered output frames, such as a screen resolution associated with the computing device that is displaying the output frames, a communications reception bandwidth (e.g. the rate at which data can be received) associated with the computing device that is displaying the output frames, a complexity setting of the rendered output frames, other rendering-related settings or any combination thereof. In FIG. 1, the first rendering settings 130 include a first (rendering) complexity setting 304 and the Nth rendering settings 132 include an Nth (rendering) complexity setting 306. For example, if the first game instance 126 is associated with the first computing device 102, the first rendering settings 130 may indicate that the first computing device 102 has a screen resolution of 1280×720 pixels, a communications reception bandwidth) of 10 megabits per second (mbps), and a high complexity rendering setting. The communications bandwidth may include a minimum bandwidth, a maximum bandwidth, an average bandwidth, or any combination thereof.

Each of the game instances 126 to 128 may have the corresponding environmental settings 222 to 224. The environmental settings 222 to 224 may change as players progress through the game play of the game instances 126 to 128. The environmental settings 222 to 224 may identify a zone or region where the game play is taking place, whether game play is taking place at night or during the day, weather conditions associated with the game place, seasonal conditions (e.g., spring, summer, fall, winter, monsoon, etc.) associated with the game play, a number of objects (e.g., moving objects, such as monsters) visible in the game play, and other environmental details associated with the game play of each of the game instances 126 to 128.

The server 106 may determine an estimated perceived quality 308 to 310 for each of the game instances 118 to 120 based on the corresponding rendering settings 130 to 132 and the environmental settings 222 to 224. Each of the estimated perceived quality 308 to 310 may be determined such that the resultant estimated perceived quality is a decimal value between −1 and 1 or between 0 and 1. A lower value (e.g., 0.4) may indicate a lower estimated perceived quality as compared to a higher value (e.g., 0.8).

The server 106 may determine a first rendering time 312 to render an output frame of the first game instance 126 and an Nth rendering time 314 to render an output frame of the Nth game instance 128. The server 106 may determine a total rendering time to render the output data 112 by summing the N rendering times 312 to 314. Thus, the server 106 may repeatedly adjust the rendering settings of the game instances 126 to 128 such that the total of the rendering times 312 to 314 is less than the capacity 302 while maximizing a sum of the estimate perceived quality of the game instances. For example, in equation form, the problem the server 106 repeatedly solved may be expressed as:

(SUM(rendering times 312 to 314)<capacity 302)
AND (MAXIMIZE(SUM(estimated perceived
quality 308 to 310))

Of course, alternate objective functions for which approximation solutions are available, such as Min-Max may be used to estimated perceived quality. As the total amount of rendering time of the game instances 126 to 128 approaches the capacity 302 (e.g., processing capacity or rendering capacity), the server 106 may identify which of the rendering settings 130 to 132 to adjust such that the total amount of the estimated perceived quality 308 to 310 is maximized (e.g., by keeping the total amount relatively high) based on the game data 134. For example, the server 106 may determine, based on the environmental settings 222 to 224, that the first game instance 126 includes a poorly-lit environment, relatively few moving objects, or relatively few special effects (e.g., explosions, fog, etc.) while the Mth game instance 128 includes a well-lit environment, one or more moving objects, or one or more special effects. The server 106 may determine, based on the game data 134, that adjusting the first rendering settings 130, e.g., by lowering the complexity setting 304 from HC to LC, may result in the total of the estimated perceived quality 308 to 310 being higher as compared to adjusting the Nth rendering settings 132. For example, adjusting the first rendering settings 130 by lowering the complexity setting 304 from HC to LC may result in the total of the estimated perceived quality 308 to 310 being X while adjusting the Nth rendering settings 132 by lowering the complexity setting 306 from HC to LC may result in the total of the estimated perceived quality 308 to 310 being Y, where X>Y. In response to this determination, the server 106 may adjust the first rendering settings 130, e.g., by lowering the complexity setting 304 from a higher complexity setting to a lower complexity setting. While this example illustrates the server 106 adjusting one set of rendering settings, in a typical implementation, the server 106 may adjust one or more of the rendering settings 130 to 132.

The server 106 may determine which of the rendering settings 130 to 132 to adjust based on the game data 134. The game data 134 may include a first entry 140 to the Pth entry 142. The first entry may include the first rendering settings 138, the first perceived quality (PQ) difference 144, the first rendering time 146, and the first environmental settings 150. The Pth entry 142 may include a Pth PQ difference 316, Pth rendering settings 318, Pth environmental settings 320, and a Pth rendering time 322. The server 106 may compare the environmental settings 222 to 224 of the game instances 126 to 128 with the environmental settings 150, 308. For example, when one of the environmental settings 222 to 224 of the game instances 126 to 128 matches one of the environmental settings 150, 308 of the entries 140 to 142, the server 106 may identify the perceived quality difference (e.g., one of the PQ differences 144, 304) and the rendering time (e.g., one of the rendering times 144, 310) associated with lower complexity rendering settings (e.g., the rendering settings 138, 306). The server 106 may select one or more of the rendering settings 138, 306 that results in the total rendering time for the game instances 126 to 128 being less than the capacity 302 and results in the least drop in the sum of the estimated perceived quality 308 to 310.

In some implementations, the server may maximize the sum of the estimated perceived quality 308 to 310 by minimizing a drop in the sum of the estimated perceived quality from pre-adjustment to post-adjustment. For example, the server 106 may determine the sum of the estimated perceived quality 308 to 310 before adjusting the rendering settings 130 to 132 (e.g., pre-adjustment sum). The server 106 may identify one or more of the rendering settings 130 to 132 that can be adjusted such that the difference between the post-adjustment sum of the estimated perceived quality 308 to 310 and the pre-adjustment sum of the estimated perceived quality 308 to 310 is less than a predetermined estimated perceived quality threshold. For example, the server 106 may identify one or more of the rendering settings 130 to 132 that can be adjusted such that the post-adjustment sum of the estimated perceived quality 308 to 310 is less than a five percent drop from the pre-adjustment sum of the estimated perceived quality 308 to 310.

The server 106 may use various techniques to avoid repeatedly adjusting the same rendering settings (e.g., one or more of the rendering settings 130 to 132) in a short period of time. For example, users engaged in a particular game instance may not enjoy the experience of the corresponding complexity setting being repeatedly adjusted, e.g., adjusted from HC to LC and then back to HC (or adjusted from LC to HC and then back to LC) within a short period of time. To avoid such situations, when the server 106 adjusts one or more of the rendering settings 130 to 132, the server 106 may add a timestamp to the adjusted rendering settings to identify when the rendering settings were last adjusted. When the difference between the current time and the timestamp of the adjusted rendering settings is less than a predetermined time interval (e.g., one minute, five minutes, ten minutes, twenty minutes, or the like), the server 106 may not adjust one or more of the rendering settings 130 to 132.

In an implementation where there are more than two complexity settings, the server 106 may use the timestamp identifying the last time the rendering settings were adjusted to avoid repeatedly adjusting the same rendering settings (e.g., one or more of the rendering settings 130 to 132) within a short period of time. For example, in an implementation that includes a high complexity setting, a medium complexity setting, and a low complexity setting, when a particular complexity setting (e.g., of the complexity settings 304 to 306) is adjusted from high complexity to medium complexity, the server 106 may not adjust the particular complexity setting from medium complexity to low complexity within a predetermined time period (e.g., one minute, five minutes, ten minutes, twenty minutes, or the like). As another example, when a particular complexity setting (e.g., of the complexity settings 304 to 306) is adjusted from high complexity to medium complexity, the server 106 may not further drop the particular complexity setting from medium complexity to low complexity until the remainder of the complexity settings 304 to 306 have been adjusted to medium complexity.

Thus, after gathering the gaming data 134, the server 106 may periodically adjust the rendering settings corresponding to one or more game instances. For example, if a difference between the processing capacity of the server 106 and the total processing power to render the multiple game instances 126 to 128 is less than a rendering threshold, the server 106 may identify and adjust one or more rendering settings. The server 106 may identify and adjust rendering settings that provide the most "bang for the buck", e.g., those rendering settings whose adjustment results in a relatively small drop in estimated perceived quality but a relatively large drop in rendering time. Expressed mathematically, the server 106 may identify and adjust rendering settings to reduce the total rendering time to render the multiple game instances (e.g., such that total rendering time<rendering capacity) while maximizing the total estimated perceived quality. In some cases, the total estimated perceived quality may be maximized by minimizing the difference between the pre-adjustment total estimated perceived quality of the multiple game instances and the post-adjustment total estimated perceived quality of the multiple game instances or adjusting one or more rendering settings such that a difference between the pre-adjustment total estimated perceived quality and the post-adjustment total estimated perceived quality is less than an estimated perceived quality threshold.

When the server 106 determines that the server 106 has additional rendering capacity and one or more game instances are at less than the highest complexity rendering setting, the server 106 may adjust at least one of the one or more game instances to a higher complexity rendering setting. For example, if a difference between the processing capacity of the server 106 and the total processing power to render the multiple game instances 126 to 128 is greater than a second rendering threshold, the server 106 may identify and adjust one or more rendering settings. The server 106 may identify rendering settings that have a complexity setting that is less than the highest available complexity setting and adjust the rendering settings to a higher complexity setting to maximize the total estimated perceived quality of the multiple game instances such that the total time to render the multiple game instances does not exceed the capacity of the server 106. For example, the server 106 may identify and adjust rendering settings to maximize the total estimated perceived quality such that total rendering time is less than the rendering capacity of the server 106.

Example Processes

Figure 5:
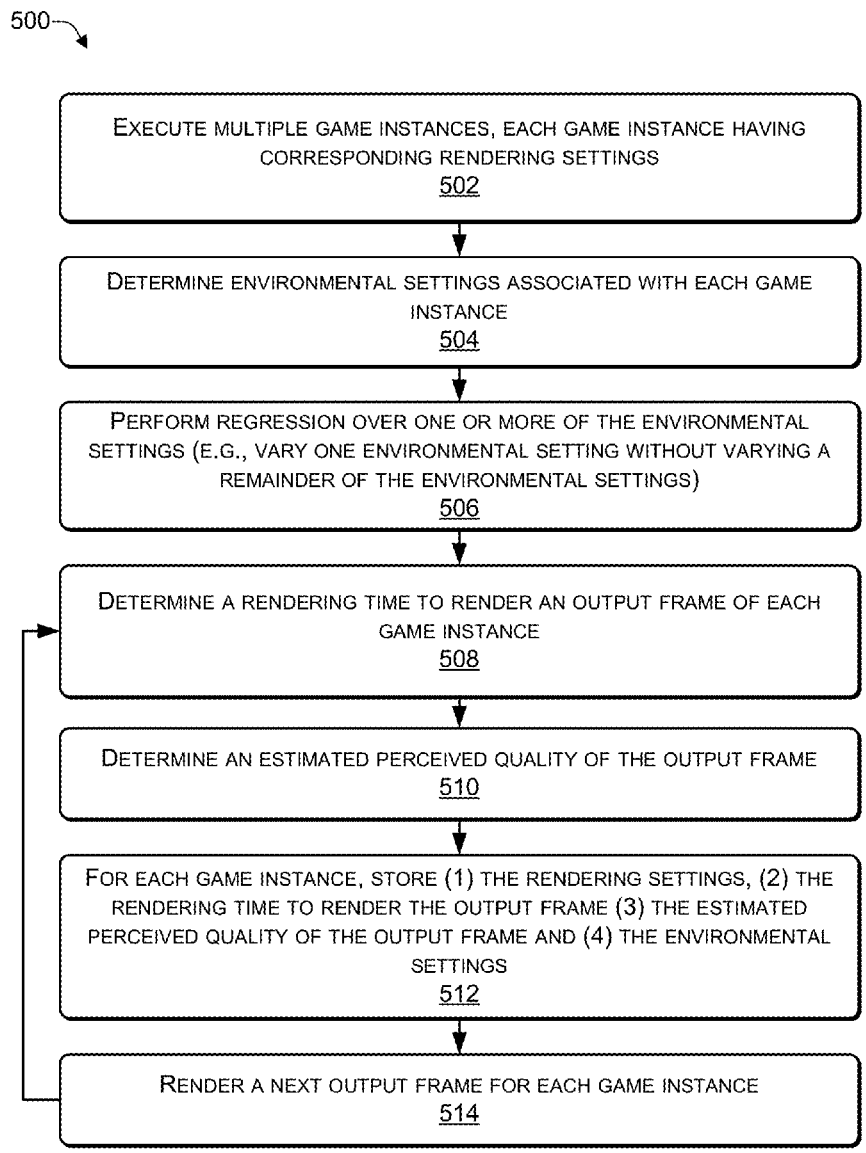
FIG. 5 is a flow diagram of an example process that includes performing regression over environmental settings according to some implementations.
Figure 6:
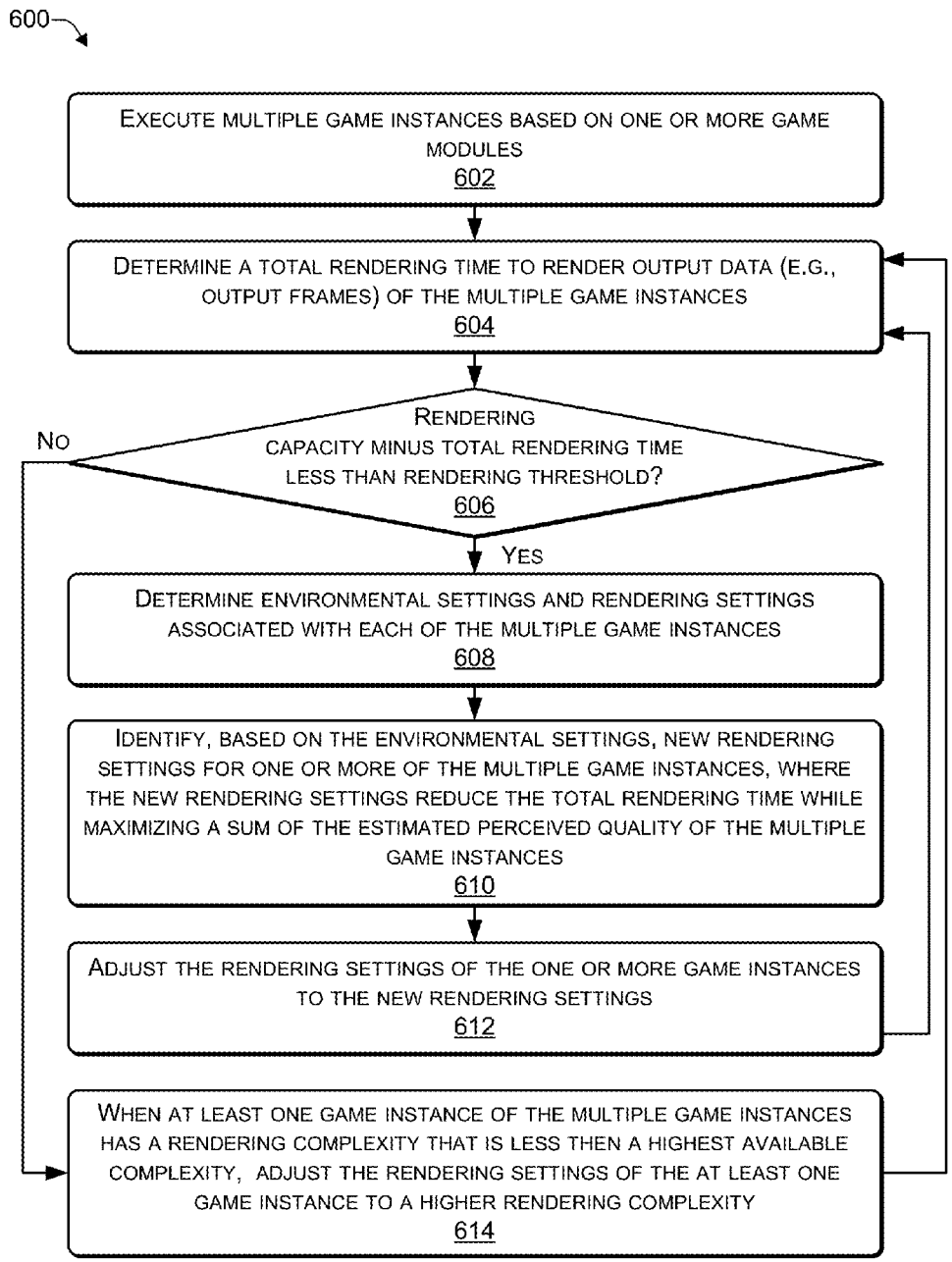
FIG. 6 is a flow diagram of an example process that includes adjusting rendering settings of one or more game instances according to some implementations.

In the flow diagrams of FIGS. 4-6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to the architectures 100, 200, and 300 as described above, although other models, frameworks, systems and environments may be used to implement these processes.

FIG. 4 is a flow diagram of an example process 400 that includes executing one or more shadow instances according to some implementations. For example, the process 400 may be performed by one or more gaming servers, such as the server 106 of FIGS. 1, 2, and 3.

At 402, multiple game instances (e.g., based on one or more game modules or game engines) may be executed. Each game instance of the multiple game instances may have corresponding rendering settings. For example, in FIG. 1, the server 106 may execute the game instances 126 to 128 with the corresponding rendering settings 130 to 132.

At 404, one or more shadow instances may be executed. Each shadow instance may shadow one of the multiple game instances. A shadow instance that is shadowing a game instance may have a different rendering setting compared to the game instance. For example, in FIG. 1, the server 106 may execute the shadow instance 136 that shadows one of the name instances 126 to 128. The shadow instance 136 may have the corresponding rendering settings 138. When the shadow instance 136 is shadowing the Nth game instance 128, the shadow rendering settings 138 may be different from the Nth rendering settings 132.

At 406, a rendering time to (1) render an output frame of the game instances that are being shadowed may be determined and (2) render an output frame of the shadow instances may determined. At 408, a difference in perceived quality of (1) the output frame and (2) the shadow frame may be determined. For example, in FIG. 2, the server 106 may determine (1) the first rendering time 210 to render the first frame 202 of the Nth game instance 128 and (2) the first shadow rendering time 214 to render the first shadow frame 206 of the shadow instance 136. The server 106 may determine the first difference in perceived quality 218 between the first frame 202 and the first shadow frame 206.

At 410, for each shadow instance, the server may store (1) the rendering settings of the shadow instance, (2) the rendering time to render the shadow frame, (3) the difference in the perceived quality between the output frame and the shadow frame, and (4) the environmental settings (e.g., associated with a game instance and the shadow instance that is shadowing the game instance). For example, in FIG. 1, the server 106 may store in the gaming data 134 (1) the shadow rendering settings 138, (2) the rendering time 146, (3) the perceived quality difference 144, and (4) the environmental settings 150 associated with the Nth game instance 128 and the shadow instance 136 that is shadowing the Nth game instance 128.

At 412, the server may render a next output frame for each game instance being shadowed and a next shadow frame for each shadow frame, and the process may proceed to 406, where the rendering time of the next output frame and the next shadow frame may be determined. For example, in FIG. 2, the server 106 may render the Qth frame 204 and the Qth shadow frame 208. The server 106 may determine the Qth rendering time 212, the Qth shadow rendering time 216, and the Qth difference in perceived quality 220. In some cases, 406 to 412 may be repeated for a predetermined period of time or until a predetermined quantity of gaming data has been gathered.

Thus, when executing multiple game instances, one or more shadow instances may be used to shadow the game instances. A shadow instance that is shadowing a game instance may have different shadow rendering settings (e.g., including a lower complexity setting) as compared to the rendering settings of the game instance that is being shadowed. The time to render output frames of the game instance and shadow frames of the shadow instance may be determined. A difference in perceived quality between the shadow frames and the output frames may be determined. The server may periodically store various information, such as the shadow rendering settings, the rendering time to render the shadow frames, the difference in perceived quality, and environmental settings associated with both the game instances and the shadow instances.

In some cases, the information gathered using the shadow instances may be analyzed. For example, in FIG. 1, the gaming data 134 may be analyzed and some of the entries 140 to 142 deleted and/or modified to reduce the number of entries. For example, the zone 152 may identify a poorly-lit environment and multiple entries may be associated with the poorly-lit environment. Analyzing the multiple entries may determine that the perceived quality difference 144 is not affected by the number of objects 158 to 160 in the poorly-lit environment. In this example, the multiple entries may deleted and replaced with a single entry indicating that the number of objects in the output do not need to be considered. For example, a wild-card character (e.g., "*") may be used to indicate that a particular environmental setting, such as a number of the objects 158 to 160, does not affect the perceived quality difference 144. As another example, the poorly-lit environment may be the inside of a building with no windows or light, such that that environment is poorly-lit regardless of the game time of day 156, e.g., regardless of whether the game play takes place during the day or at night. In this example, the perceived quality difference 144 may not change when the game time of day 156 changes. A wild-card character or other notation may be used to indicate that a particular environmental setting, e.g., the game time of day 156, does not affect the perceived quality difference 144.

The stored information may be used to identify environments where the rendering complexity can be adjusted form a higher complexity to a lower complexity to reduce the rendering time without a significant (e.g., perceptible) drop in estimated perceived quality. For example, environments with a relative low amount of lighting or with relative few moving objects may be identified as environments where the rendering settings may be adjusted to a lower complexity level with a tolerable drop in the estimated perceived quality.

FIG. 5 is a flow diagram of an example process 500 that includes performing regression over environmental settings according to some implementations. For example, the process 500 may be performed by one or more gaming servers, such as the server 106 of FIGS. 1, 2, and 3.

At 502, multiple game instances (e.g., based on one or more game modules or game engines) may be executed. Each game instance of the multiple game instances may have corresponding rendering settings. For example, in FIG. 1, the server 106 may execute the game instances 126 to 128 with the corresponding rendering settings 130 to 132.

At 504, environmental settings associated with each game instance may be determined. For example, in FIG. 3, the server 106 may determine the environmental settings 222 to 224 corresponding to the game instances 126 to 128.

At 506, regression may be performed over one or more of the environmental settings. For example, one environmental setting may be varied while a remainder of the environmental settings are held invariant (e.g., constant).

At 508, the server may determine a rendering time to render each output frame of each game instance. For example, in FIG. 2, the server 106 may determine the rendering times 210 to 212 to render the frames 202 to 204.

At 510, the server may determine an estimated perceived quality of each output frame. For example, in FIG. 3, the server 106 may determine the estimated perceived quality 308 to 310 associated with an output frame of the game instances 126 to 128.

At 512, for each game instance, the server may store (1) the rendering settings, (2) the rendering time to render the output frame, (3) the estimated perceived quality of the output frame, and (4) the environmental settings (e.g., associated with a game instance). For example, in FIG. 1, the server 106 may store in the gaming data 134 (1) one of the rendering settings 130 to 132, (2) the rendering time 146, (3) the perceived quality difference 144, and (4) the environmental settings 150.

At 514, the server may render a next output frame for each game instance, and the process may proceed to 508, where the rendering time to render the next output frame may be determined. For example, in FIG. 2, the server 106 may render the Qth frame 204 and determine the Qth rendering time 212. In some cases, 508 to 514 may be repeated for a predetermined period of time or until a predetermined quantity of gaming data has been gathered.

Thus, regression over one or more environmental variables may be performed to identify environmental settings where the rendering settings may be adjusted from a higher complexity level setting to a lower complexity level setting to reduce the rendering time with an imperceptible or barely perceptible drop in estimated perceived quality. For example, when multiple game instances are executing on a server and the total time to render the game instances begins to approach the rendering capacity of the server (e.g., capacity−total rendering time<rendering threshold), the sever may adjust the rendering settings of one or more game instances (e.g., to a lower complexity setting) while maximizing the total estimated perceived quality of the output of the multiple game instances. When the server determines that the total rendering time has decreased, one or more of the game instances whose rendering settings were adjusted (e.g., to a lower complexity setting) may be re-adjusted to a higher complexity setting.

FIG. 6 is a flow diagram of an example process 600 that includes adjusting rendering settings of one or more game instances according to some implementations. For example, the process 600 may be performed by one or more gaming servers, such as the server 106 of FIGS. 1, 2, and 3.

At 602, multiple game instances, based on one or more game modules, may be executed. At 604, a total rendering time to render output data (e.g., output frames) of the multiple game instances may be determined. For example, in FIG. 3, the server 106 may execute the game instances 126 to 128 and determine a total time to render the output data 112 by adding the N rendering times 312 to 314 associated with the game instances 126 to 128.

At 606, a determination may be made as to whether a rendering capacity of the server minus a total rendering time (e.g., to render the output data) is less than a rendering threshold. For example, in FIG. 3, the server 106 may compare a result of subtracting a sum of the rendering times 312 to 314 from the capacity 302 with a predetermined rendering threshold. In some cases, the predetermined rendering threshold may be a percentage of the capacity 302.

In response to determining that the rendering capacity of the server minus the total rendering time is less than the rendering threshold, at 606, environmental settings and rendering settings associated with each of the multiple game instances are determined, at 608. For example, in FIG. 3, the server 106 may determine the rendering settings 130 to 132 and the environmental settings 222 to 224 of the game instances 126 to 128.

At 610, new rendering settings for one or more of the multiple game instances are identified based on the environmental settings. The new rendering settings may reduce the total rendering time (e.g., to render the output data) while maximizing a sum of the estimated perceived quality of the multiple game instances. At 612, the rendering settings of one or more of the game instances may be adjusted to the new rendering settings, and the process may proceed to 604 to determine a total rendering time to render next output data (e.g., next output frames) of the multiple game instances. For example, in FIG. 3, the server 106 may compare the environmental settings 222 to 224 to the environmental settings 150, 320 to identify one of the entries 140 to 142 that has matching (e.g., same) environmental settings. For example, if the Nth environmental settings 224 match the Pth environmental settings 320, the server 106 may identify the Pth rendering settings 318 as the new rendering settings. The Pth rendering settings 318 may have a Pth rendering time 322 that is less than the Nth rendering time 314 and a Pth PQ difference 316 that results in maximizing the sum of the estimated perceived quality 308 to 310. The server 106 may adjust the Nth rendering settings 132 to match the new rendering settings, e.g., the Pth rendering settings 318.

In response to determining that the rendering capacity of the server minus the total rendering time is greater than or equal to the rendering threshold, at 606, the process may proceed to 614. At 614, when at least one game instance of the multiple game instances has a rendering complexity that is less than a highest available complexity, the rendering settings of the at least one game instance may be adjusted to a higher rendering complexity, and the process may proceed to 604 to determine a total rendering time to render next output data (e.g., next output frames) of the multiple game instances. For example, in FIG. 3, if the capacity 302 minus the sum of the rendering times 312 to 314 is greater than a second rendering threshold (e.g., a second percentage of the capacity 302), the server 106 may determine whether at least one of the complexity settings 304 to 306 are set to a complexity setting (e.g., LC or MC) that is below a highest available complexity setting (e.g., HC). The server 106 may determine whether adjusting the at least one of the complexity settings 304 to 306 to a higher complexity setting would result in the capacity 302 minus the sum of the rendering times 312 to 314 exceeding the rendering threshold. If the server 106 determines that adjusting at least one of the complexity settings 304 to 306 to a higher complexity setting would not result in the capacity 302 minus the sum of the rendering times 312 to 314 exceeding the rendering threshold, the server 106 may adjust at least one of the complexity settings 304 to 306 to a higher complexity setting.

Thus, when executing multiple game instances, the host server may periodically determine whether the total time to render the output frames of the multiple game instances is approaching the processing capacity (e.g., rendering capacity) of the server. For example, the server may determine whether the processing capacity minus the total time to render the output frames is less than a rendering threshold. When the total time to render the output frames of the multiple game instances is approaching the processing capacity, the server may identify new rendering settings that reduce the total time to render the output frames while providing an imperceptible or barely perceptible drop in estimated perceived quality using the new rendering settings, thus maximizing the total estimated perceived quality of the game instances. The new rendering settings may be identified using previously gathered gaming data. The server may adjust one or more of the rendering settings to the new rendering settings. At a later point in time, based on the total time to render the output frames of the multiple game instances, the server may re-adjust at least one of the rendering settings from a lower complexity rendering setting to a higher complexity rendering setting.

FIG. 7 is an illustrative architecture 700 that includes gaming data according to some implementations. For example, the server 106 of FIG. 1, 2, or 3 may gather and use the gaming data 134 to dynamically adjust the complexity of rendering settings such that the total processing time to render output frames for multiple game instances hosted by the server 106 does not exceed a total processing capacity of the server 106 while maximizing the aggregate estimated perceived quality of the multiple game instances.

While the gaming data 134 is illustrated in FIG. 7 in the form of a table, other data structures may be used to store the gaming data 134. The gaming data 134 may include multiple entries, such as the first entry 140, a second entry 702, a P−1 entry 704, and the Pth entry 142. Each entry may include environmental settings 706, a rendering time 708, a rendering complexity level 710, an estimated perceived quality 712, and resource utilization 714. The environmental settings 706 may identify a current environment associated with a gaming instance, such as a zone or area in which the game play is taking place, how many objects are visible, etc. The rendering time 708 may identify an amount of processing (e.g., rendering) time taken to render one or more output frames in a given time interval at the corresponding environmental settings 706. The rendering complexity level 710 may identify the complexity level of the rendering settings, e.g., such as a high complexity level or a low complexity level. The estimated perceived quality 712 may identify the estimated perceived quality (e.g., using SSIM or PEVQ) that has been calculated for the corresponding environmental settings 706. The resource utilization (RU) 714 may identify the utilization of other resources of the server 106, such as a main memory utilization of the server 106, utilization of storage drives of the server 106, an interconnect bus utilization of the server 106, utilization of other resources of the server 106, or any combination thereof.

The first entry 140 may identify environmental settings associated with a game instance, such as the zone 152, the objects 158 to 160, etc. The second entry 702 may identify environmental settings associated with a game instance, such as a zone 716, objects 718 to 720, etc. The P−1 entry 704 may identify environmental settings associated with a game instance, such as a zone 722, objects 724 to 726, etc. The Pth entry 142 may identify environmental settings associated with a game instance, such as a zone 728, objects 730 to 732, etc.

The first entry 140 may have a rendering time X, a high rendering complexity level, an estimated perceived quality of Y, and a first amount of resource utilization (RU) 734. The second entry 702 may have a rendering time Z, a low rendering complexity level, an estimated perceived quality of W, and a second amount of resource utilization (RU) 736. The P−1 entry 704 may have a rendering time A, a high rendering complexity level, an estimated perceived quality of B, and a third amount of resource utilization (RU) 738. The Pth entry 142 may have a rendering time C, a low rendering complexity level, an estimated perceived quality of D, and a Pth amount of resource utilization (RU) 740.

Assume we have two game instances hosted by the server 106, with the first game instance having environmental settings corresponding to the first entry 140 and the second game instance having environmental settings corresponding to the P−1 entry 704. Assume also that the second entry 702 has the same environmental settings as the first entry 140 (e.g., zone 152=zone 612, etc.) and the Pth entry 142 has the same environmental settings as the P−1 entry 704 (e.g., zone 722=zone 728, etc.). If the server 106 determines that X+A>capacity, e.g., that X plus A is greater than a processing capacity of the server 106 (e.g., the capacity 302 of FIG. 3), then the server 106 may determine whether X+C<capacity, Z+A<capacity, and/or Z+C<capacity. For example, if the server 106 determines that X+C<capacity, Z+A<capacity, and Z+C<capacity, then the server 106 may determine which of (Y+D), (W+B), or (W+D) (e.g., the aggregate estimated perceived quality) is the largest and select the corresponding environmental settings. To illustrate, if (Y+D)>(W+B)>(W+D), then the server 106 may adjust the rendering complexity of the second game instance to low, with a rendering time of C (e.g., total rendering time X+C) and an estimated perceived quality of D. If (W+B)>(Y+D)>(W+D), then the server 106 may adjust the rendering complexity of the first game instance to low, with a rendering time of Z (e.g., total rendering time Z+A) and an estimated perceived quality of W. If (W+D)>(Y+D)>(W+B), then the server 106 may adjust the rendering complexity of the first game instance to low, with a rendering time of Z and an estimated perceived quality of W, and adjust the rendering complexity of the second game instance to low, with a rendering time of C and an estimated perceived quality of D.

Thus, the server 106 may use the gaming data 134 to identify gaming instances whose rendering settings can be adjusted while keeping the aggregate estimated perceived quality as high as possible. The gaming data 134 may be gathered using one or more shadow instances or using regression analysis.

Example Computing Device and Environment

Figure 8:
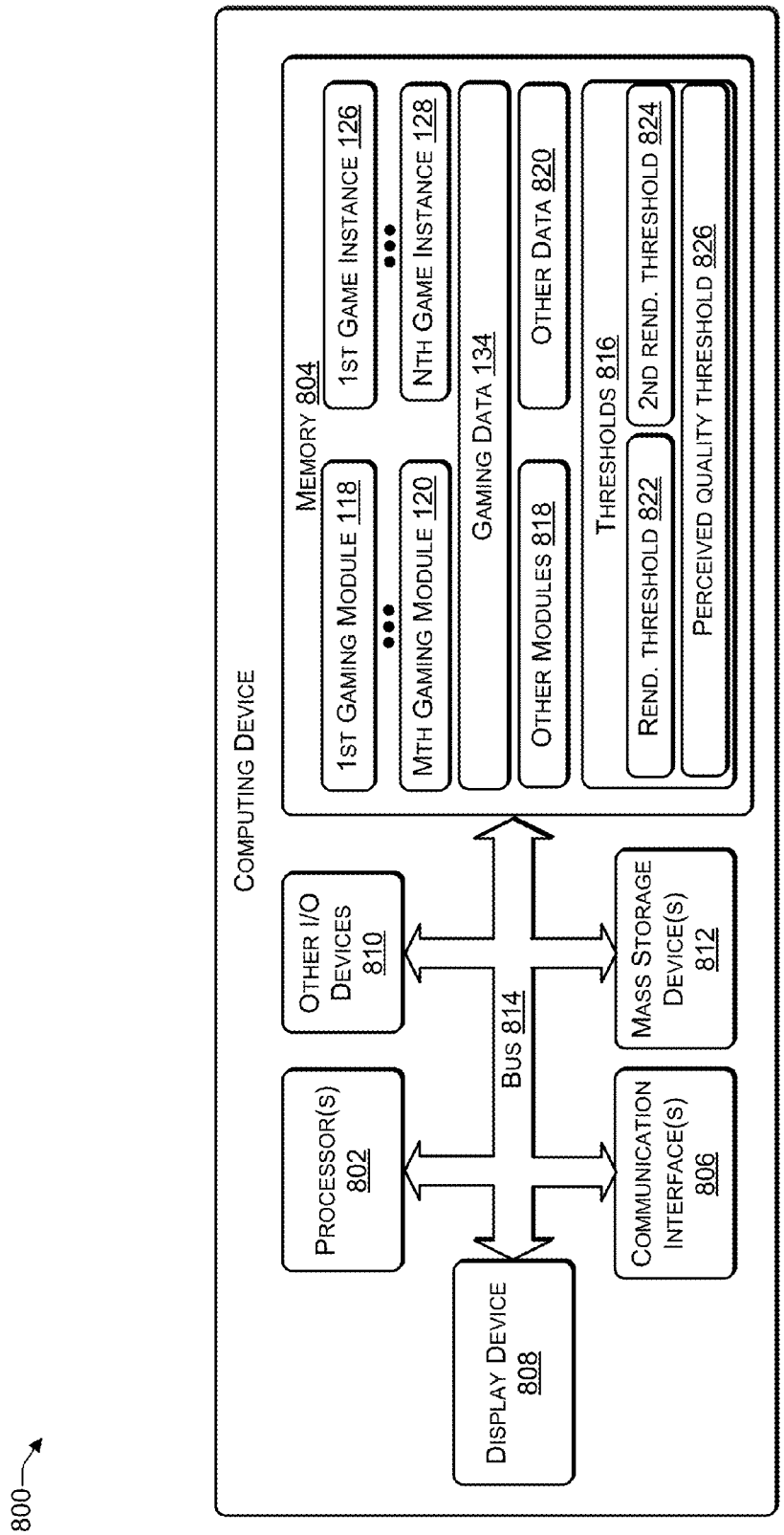
FIG. 8 illustrates an example configuration of a computing device and environment that can be used to implement the modules and functions described herein.

FIG. 8 illustrates an example configuration of a computing device 800 and environment that can be used to implement the modules and functions described herein. For example, the server 106 may include an architecture that is similar to or based on the computing device 800.

The computing device 800 may include one or more processors 802, a memory 804, communication interfaces 806, a display device 808, other input/output (I/O) devices 810, and one or more mass storage devices 812, able to communicate with each other, such as via a system bus 814 or other suitable connection.

The processor 802 may be a single processing unit or a number of processing units, all of which may include single or multiple computing units or multiple cores. The processor 802 may be implemented as one or more microprocessors, microcomputers, microcontrollers, digital signal processors, central processing units, state machines, logic circuitries, and/or any device(s) that manipulate signals based on operational instructions. Among other capabilities, the processor 802 may be configured to fetch and execute computer-readable instructions stored in the memory 804, mass storage devices 812, or other computer-readable media.

Memory 804 and mass storage devices 812 are examples of computer storage media for storing instructions, which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be capable of storing computer-readable, processor-executable program instructions as computer program code that can be executed by the processor 802 as a particular machine configured for carrying out the operations and functions described in the implementations herein.

Computer storage media includes non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

The computing device 800 may also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, voice input, and so forth.

Memory 804 may include modules and components for hosting game instances and adjusting rendering settings according to the implementations described herein. The memory 804 may include multiple modules (e.g., the modules 118 to 120) to perform various functions. The memory 804 may also include thresholds 816, other modules 816 that implement other features, and other data 818 that includes intermediate calculations and the like. The threshold 816 may include various predetermined thresholds that may be set by a system administrator or other user, such as a rendering threshold 822 (e.g., used to determine when to adjust one or more complexity settings to a lower complexity setting), a second rendering threshold 824 (e.g., used to determine when to adjust at least one complexity setting to a higher complexity setting), and a perceived quality threshold 826 (e.g., one or more rendering settings may be adjusted when a difference between a post-adjustment sum of the estimated perceived quality and a pre-adjustment sum of the estimated perceived quality is less than the perceived quality threshold). The other modules 816 may include various software, such as an operating system, drivers, communication software, or the like.

Adjusting Rendering Settings when Providing Multimedia Content

Figure 9:
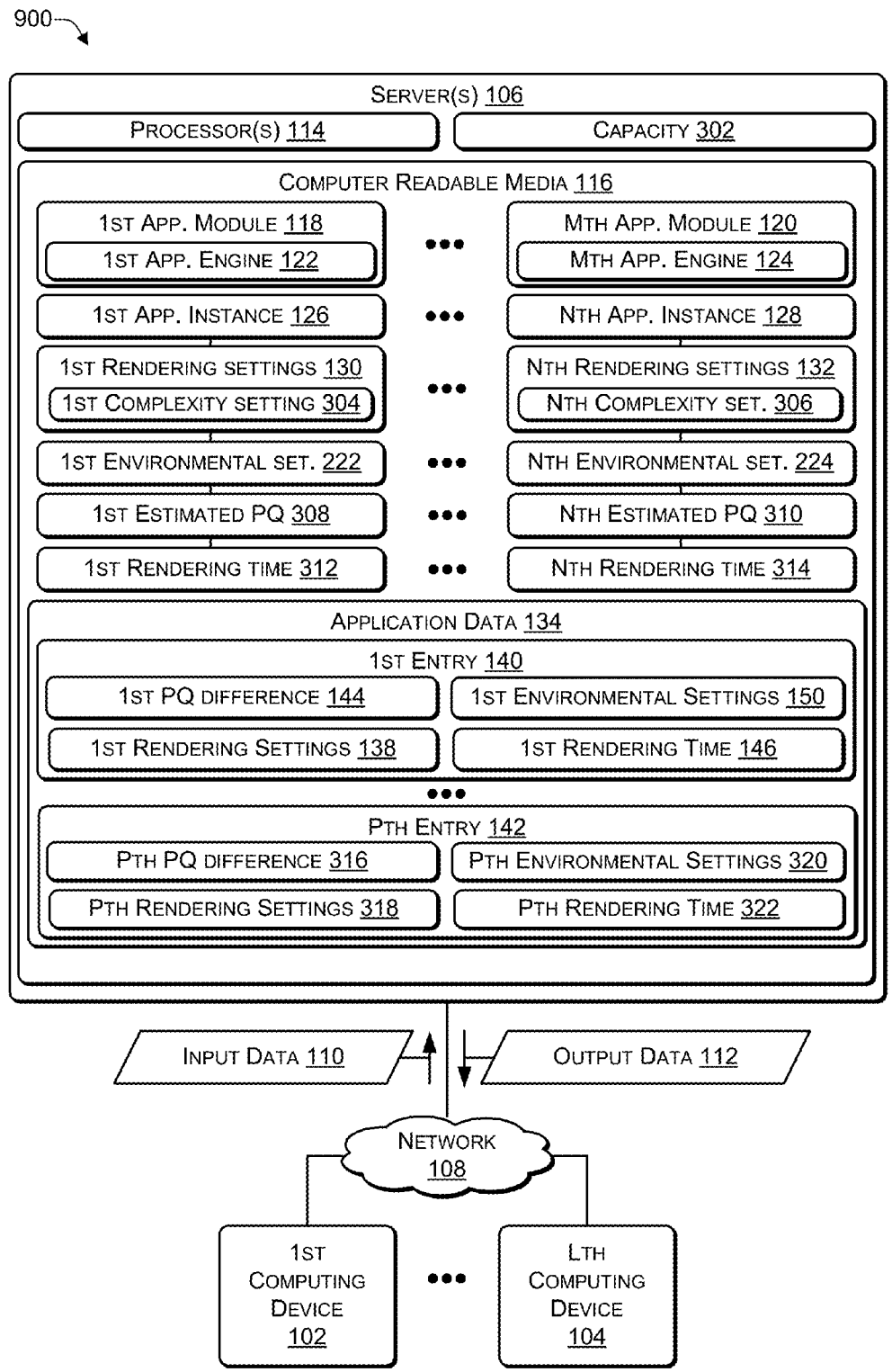
FIG. 9 is an illustrative architecture to adjust rendering settings of applications providing multimedia content according to some implementations.

FIG. 9 is an illustrative architecture 900 to adjust rendering settings of applications providing multimedia content according to some implementations. The architecture 900 illustrates how the techniques described herein may be used to adjust the rendering complexity of applications that provide multimedia content (e.g., streaming media content, such as stream, audio or video). For example, the techniques described herein may be used when the capacity 302 of the server 106 is greater than a threshold amount, such as 80% of the capacity 302, 90% of the capacity 302, or the like. As another example, the techniques described herein may be used when a difference between the processing capacity 302 and the total amount of rendering time to render the application instances 126 to 128 is less than a predetermined rendering threshold.

The server 106 may host the application instances 126 to 128 with the corresponding rendering settings 130 to 132. The application instances 126 to 128 may provide multimedia content to the computing devices 102 to 104. For example, the multimedia content may include gaming output, television shows, movies, live events (e.g., sporting events), music videos, or other types of multimedia content, including interactive multimedia content. Each of the rendering settings 130 to 132 may identify various settings associated with the rendered output frames, such as a screen resolution associated with the computing device that is displaying the output frames, a communications reception bandwidth (e.g. the rate at which data can be received) associated with the computing device that is displaying the output frames, a complexity setting of the rendered output frames, other rendering-related settings or any combination thereof. In FIG. 9, the first rendering settings 130 include the first (rendering) complexity setting 304 and the Nth rendering settings 132 include the Nth (rendering) complexity setting 306. For example, if the first application instance 126 is associated with the first computing device 102, the first rendering settings 130 may indicate that the first computing device 102 has a screen resolution of 1280×720 pixels, a communications reception bandwidth) of 10 megabits per second (mbps), and a high complexity rendering setting. The communications bandwidth may include a minimum bandwidth, a maximum bandwidth, an average bandwidth, or any combination thereof.

The server 106 may determine an estimated perceived quality 308 to 310 for each of the application instances 118 to 120 based on the corresponding rendering settings 130 to 132. The server 106 may determine a first rendering time 312 to render an output frame of the first application instance 126 and an Nth rendering time 314 to render an output frame of the Nth application instance 128. The server 106 may determine a total rendering time to render the output data 112 by summing the N rendering times 312 to 314. Thus, the server 106 may repeatedly adjust the rendering settings of the application instances 126 to 128 such that the total of the rendering times 312 to 314 is less than the capacity 302 while maximizing a sum of the estimate perceived quality of the application instances.

As the total amount of rendering time of the application instances 126 to 128 approaches the capacity 302 (e.g., processing capacity or rendering capacity), the server 106 may identify which of the rendering settings 130 to 132 to adjust such that the total amount of the estimated perceived quality 308 to 310 is maximized (e.g., by keeping the total amount relatively high) based on the application data 134. The server 106 may determine, based on the application data 134, that adjusting the first rendering settings 130 (e.g., by lowering the complexity setting 304 from HC to LC) may result in the total of the estimated perceived quality 308 to 310 being higher as compared to adjusting the Nth rendering settings 132. The server 106 may adjust one or more of the rendering settings 130 to 132.

The server 106 may determine which of the rendering settings 130 to 132 to adjust based on the application data 134. The server 106 may select one or more of the rendering settings 138, 306 that results in the total rendering time for the application instances 126 to 128 being less than the capacity 302 and results in the least drop in the sum of the estimated perceived quality 308 to 310.

The server may maximize the sum of the estimated perceived quality 308 to 310 by minimizing a drop in the sum of the estimated perceived quality from pre-adjustment to post-adjustment. For example, the server 106 may determine the sum of the estimated perceived quality 308 to 310 before adjusting the rendering settings 130 to 132 (e.g., pre-adjustment sum). The server 106 may identify one or more of the rendering settings 130 to 132 that can be adjusted such that the difference between the post-adjustment sum of the estimated perceived quality 308 to 310 and the pre-adjustment sum of the estimated perceived quality 308 to 310 is less than a predetermined estimated perceived quality threshold. For example, the server 106 may identify one or more of the rendering settings 130 to 132 that can be adjusted such that the post-adjustment sum of the estimated perceived quality 308 to 310 is less than a five percent drop from the pre-adjustment sum of the estimated perceived quality 308 to 310.

The server 106 may use various techniques to avoid repeatedly adjusting the same rendering settings (e.g., one or more of the rendering settings 130 to 132) in a short period of time. For example, users engaged in a particular application instance may not enjoy the experience of the corresponding complexity setting being repeatedly adjusted, e.g., adjusted from HC to LC and then back to HC (or adjusted from LC to HC and then back to LC) within a short period of time. To avoid such situations, when the server 106 adjusts one or more of the rendering settings 130 to 132, the server 106 may add a timestamp to the adjusted rendering settings to identify when the rendering settings were last adjusted. When the difference between the current time and the timestamp of the adjusted rendering settings is less than a predetermined time interval (e.g., one minute, five minutes, ten minutes, twenty minutes, or the like), the server 106 may not adjust one or more of the rendering settings 130 to 132.

In an implementation where there are more than two complexity settings, the server 106 may use the timestamp identifying the last time the rendering settings were adjusted to avoid repeatedly adjusting the same rendering settings (e.g., one or more of the rendering settings 130 to 132) within a short period of time. For example, in an implementation that includes a high complexity setting, a medium complexity setting, and a low complexity setting, when a particular complexity setting (e.g., of the complexity settings 304 to 306) is adjusted from high complexity to medium complexity, the server 106 may not adjust the particular complexity setting from medium complexity to low complexity within a predetermined time period (e.g., one minute, five minutes, ten minutes, twenty minutes, or the like). As another example, when a particular complexity setting (e.g., of the complexity settings 304 to 306) is adjusted from high complexity to medium complexity, the server 106 may not further drop the particular complexity setting from medium complexity to low complexity until the remainder of the complexity settings 304 to 306 have been adjusted to medium complexity.

Thus, after gathering the application data 134, the server 106 may periodically adjust the rendering settings corresponding to one or more application instances hosted by one or more servers. For example, if a difference between the processing capacity of the server 106 and the total processing power to render the multiple application instances 126 to 128 is less than a rendering threshold, the server 106 may identify and adjust one or more rendering settings. The server 106 may identify and adjust those rendering settings whose adjustment results in a relatively small drop in estimated perceived quality but a relatively large drop in rendering time. Expressed mathematically, the server 106 may identify and adjust rendering settings to reduce the total rendering time to render the multiple application instances (e.g., such that total rendering time<rendering capacity) while maximizing the total estimated perceived quality. In some cases, the total estimated perceived quality may be maximized by minimizing the difference between the pre-adjustment total estimated perceived quality of the multiple application instances and the post-adjustment total estimated perceived quality of the multiple application instances or adjusting one or more rendering settings such that a difference between the pre-adjustment total estimated perceived quality and the post-adjustment total estimated perceived quality is less than an estimated perceived quality threshold.

When the server 106 determines that the server 106 has additional rendering capacity and one or more application instances are at less than the highest complexity rendering setting, the server 106 may adjust at least one of the one or more application instances to a higher complexity rendering setting. For example, the server 106 may identify and adjust rendering settings to maximize the total estimated perceived quality such that total rendering time is less than the rendering capacity of the server 106.

Figure 10:
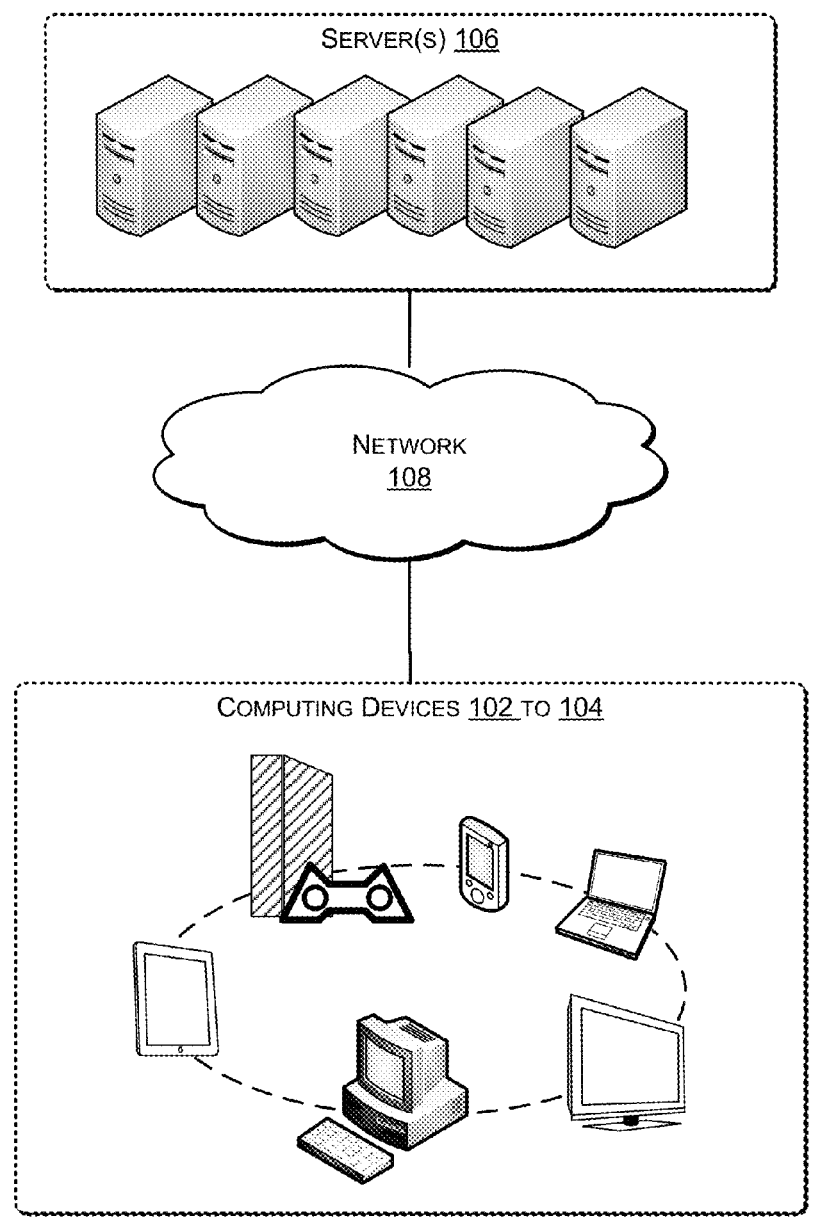
FIG. 10 is an illustrative architecture that includes multiple computing devices communicating with one or more gaming servers according to some implementations.

FIG. 10 is an illustrative architecture 1000 that includes multiple computing devices communicating with one or more servers according to some implementations. The architecture 1000 illustrates how a variety of computing devices may be used to communicate with applications, such as games, hosted by the server 106.

For example, the server 106 may host various applications, including gaming applications and applications to stream multimedia content. The applications hosted by the server 106 may provide multimedia content, including audio, video, graphics, animation, and the like, to the computing devices 102 to 104. The computing devices 102 to 104 may include one or more of a personal computer, a tablet computing device, a gaming console, a wireless phone (or other wireless mobile computing device), a laptop computer, a television set, a set-top box device, portable gaming console, or other type of computing device.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A method performed by one or more processors executing instructions to perform acts comprising:
   determining a total rendering time to render output data for a plurality of game instances;
   determining whether a difference between the total rendering time and a rendering capacity of the one or more processors is less than a predetermined rendering threshold; and
   in response to determining that the difference between the total rendering time and the rendering capacity of the one or more processors is less than the predetermined rendering threshold, adjusting a rendering complexity of one or more game instances of the plurality of game instances such that a difference between a first sum of an estimated perceived quality of each of the plurality of game instances and a second sum of the estimated perceived quality of each of the plurality of game instances after lowering the rendering complexity of the one or more game instances is less than a predetermined perceived quality threshold.

2. The method as recited in claim 1, wherein adjusting the rendering complexity of the one or more game instances of the plurality of game instances comprises:
   lowering the rendering complexity of the one or more game instances such that the difference between the total rendering time of the plurality of game instances and the rendering capacity of the one or more processors is greater than or equal to the predetermined rendering threshold.

3. The method as recited in claim 1, wherein adjusting the rendering complexity of the one or more game instances comprises:
   comparing game environmental settings of each of the plurality of game instances with stored environmental settings to identify matching environmental settings;
   determining a stored rendering time and a stored perceived quality associated with the matching environmental settings; and
   identifying the one or more game instances based on the stored rendering time and the stored perceived quality.

4. The method as recited in claim 1, wherein the acts further comprise:
   receiving input data from one or more computing devices, each of the one or more computing devices associated with a game instance of the plurality of game instances;
   generating output data comprising output frames associated with each game instance of the plurality of game instances; and
   sending the output data to the one or more computing devices.

5. The method as recited in claim 1, the acts further comprising:
   in response to determining that the difference between the total rendering time and the rendering capacity of the one or more processors is greater than a second predetermined rendering threshold, adjusting the rendering complexity of the one or more game instances to a higher complexity setting.

6. A server computing device comprising:
   one or more processors;
   one or more computer storage media storing instructions executable by the one or more processors to perform acts comprising:
      determining a total rendering time to render a plurality of multimedia content streams corresponding to an output by a plurality of application instances, each type of a plurality of client computing devices associated with an application instance of the plurality of application instances;
      determining whether a difference between the total rendering time and a rendering capacity of the server computing device is less than a predetermined rendering threshold; and
      when the difference between the total rendering time and the rendering capacity of the server computing device is less than the predetermined rendering threshold, adjusting a rendering complexity associated with at least one application instance of the plurality of application instances such that the difference between the total rendering time and the rendering capacity of the server computing device is greater than or equal to the predetermined rendering threshold, wherein adjusting the rendering complexity associated with the at least one application instance is based at least in part on a total estimated perceived quality of at least two application instances of the plurality of application instances.

7. The server computing device as recited in claim 6, wherein adjusting the rendering complexity associated with the at least one application instance comprises:
   adjusting the rendering complexity of the at least one application instance such that a difference between a first sum of an estimated perceived quality of the plurality of application instances before lowering the rendering complexity of the at least one application instance and a second sum of the estimated perceived quality of the plurality of application instances after lowering the rendering complexity of the at least one application instance is less than a predetermined perceived quality threshold.

8. The server computing device as recited in claim 6, wherein adjusting the rendering complexity associated with the at least one application instance comprises lowering the rendering complexity from a higher complexity setting to a lower complexity setting.

9. The server computing device as recited in claim 6, wherein adjusting the rendering complexity associated with the at least one application instance comprises increasing the rendering complexity from a lower complexity setting to a higher complexity setting.

10. The server computing device as recited in claim 6, wherein adjusting the rendering complexity comprises adjusting at least one of environmental settings associated with an environment of a particular application instance, rendering settings associated with the rendering complexity, a rendering time associated with the rendering settings, and an estimated perceived quality difference identifying a difference in estimated perceived quality between the rendering settings in at least one entry and application instance rendering settings of the particular application instance.

11. The server computing device as recited in claim 10, wherein the environmental settings comprise one or more of:
   a zone associated with the environment of the particular application instance,
   a type of weather or season associated with the environment of the particular application instance,
   a game time of day associated with the environment of the particular application instance, or
   a number of each type of object that is visible in the environment of the particular application instance.

12. One or more computer storage media including instructions that are executable by one or more processors to perform acts comprising:
   determining a total rendering time to render output frames associated with a plurality of game instances;
   determining a difference between the total rendering time and a rendering capacity of the one or more processors; and
   in response to determining that the difference between the total rendering time and the rendering capacity of the one or more processors is less than a predetermined rendering threshold:
      determining environmental settings associated with an environment of at least one game instance of the plurality of game instances; and
      adjusting a rendering complexity of the at least one game instance of the plurality of game instances based at least partly on the environmental settings associated with the environment of the at least one game instance and at least partly on a total estimated perceived quality of the plurality of game instances.

13. The one or more computer storage media as recited in claim 12, the acts further comprising:
   adjusting the rendering complexity of the at least one game instance based at least partly on the total rendering time of the plurality of game instances.

14. The one or more computer storage media as recited in claim 12, the acts further comprising:
   adjusting the rendering complexity of the at least one game instance based at least partly on the rendering capacity of the one or more processors.

15. The one or more computer storage media as recited in claim 12, wherein the one or more processors include at least one graphics processor.

16. The one or more computer storage media as recited in claim 12, wherein the environmental settings identify environmental components of each game instance, the environmental components including one or more of:
   a zone associated with the environment of each game instance,
   a type of weather or season associated with the environment of each game instance,
   a game time of day associated with the environment of each game instance, or
   a number of objects that are visible in the environment of each game instance.

17. The one or more computer storage media as recited in claim 12, wherein each of the environmental settings is associated with one or more of:
   particular rendering settings associated with a particular rendering complexity;
   a rendering time associated with the particular rendering settings; or
   an estimated perceived quality difference identifying a difference in estimated perceived quality between the particular rendering settings and game instance rendering settings of a particular game instance of the plurality of game instances.

18. The one or more computer storage media as recited in claim 17, wherein the particular rendering settings, the rendering time, and the estimated perceived quality difference are determined using a shadow instance of a game instance or using regression across environmental components of the environmental settings.

19. The method as recited in claim 1, wherein a game instance of the plurality of game instances is associated with a type of at least one of the one or more processors.

20. The server computing device as recited in claim 6, wherein at least one of the total rendering time, another rendering setting, or the total estimated perceived quality is determined using a shadow instance of a particular application instance or using regression across environmental components of environmental settings.

* * * * *